US012677294B2

(12) United States Patent (10) Patent No.: US 12,677,294 B2
Nagano et al. (45) Date of Patent: Jul. 7, 2026

(54) TERMINAL, BASE STATION, AND WIRELESS COMMUNICATION METHOD

(71) Applicants: DENSO CORPORATION, Kariya-city (JP); TOYOTA JIDOSHA KABUSHIKI KAISHA, Toyota (JP)

(72) Inventors: Tatsuki Nagano, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 18/618,646

(22) Filed: Mar. 27, 2024

(65) Prior Publication Data

US 2024/0244637 A1 Jul. 18, 2024

Related U.S. Application Data

(63) Continuation of application No. PCT/JP2022/036744, filed on Sep. 30, 2022.

(30) Foreign Application Priority Data

Sep. 30, 2021 (JP) ................................. 2021-162296

(51) Int. Cl.
*H04W 72/232* (2023.01)
*H04W 56/00* (2009.01)
(Continued)

(52) U.S. Cl.
CPC ..... *H04W 72/232* (2023.01); *H04W 56/0015* (2013.01); *H04W 68/02* (2013.01); *H04W 72/0457* (2023.01); *H04W 72/51* (2023.01)

(58) Field of Classification Search
CPC ........... H04W 72/232; H04W 56/0015; H04W 68/02; H04W 72/0457; H04W 72/51;
(Continued)

(56) References Cited

U.S. PATENT DOCUMENTS 12,513,707 B2 * 12/2025 Cirik ...................... H04L 5/0044
2019/0349960 A1 * 11/2019 Li .......................... H04L 1/1861
(Continued)

FOREIGN PATENT DOCUMENTS

WO 2021/161622 A1 8/2021

OTHER PUBLICATIONS

U.S. Appl. No. 18/618,786, filed Mar. 27, 2024, Nagano et al.
(Continued)

*Primary Examiner* — Schquita D Goodwin
(74) *Attorney, Agent, or Firm* — Harness, Dickey & Pierce, P.L.C.

(57) ABSTRACT

A terminal that includes a reception unit that receives system information including information used for configuring a first initial downlink bandwidth part, cell-specific information related to configuration of a physical downlink control channel in the first initial downlink bandwidth part, information used for configuring a second initial downlink bandwidth part, and cell-specific information related to configuration of a physical downlink control channel in the second initial downlink bandwidth part, and a control unit that determines a monitoring occasion of a physical downlink control channel for paging based on information related to a synchronization signal and physical broadcast channel block transmitted in the second initial downlink bandwidth part and on an identifier of a search space.

15 Claims, 21 Drawing Sheets

(51) Int. Cl.
    *H04W 68/02*       (2009.01)
    *H04W 72/0457*    (2023.01)
    *H04W 72/51*       (2023.01)

(58) Field of Classification Search
    CPC .... H04W 68/005; H04W 68/00; H04L 5/001;
            H04L 5/005; H04L 5/0053; H04L 5/0094
    See application file for complete search history.

(56) References Cited

U.S. PATENT DOCUMENTS

| | | | |
|---|---|---|---|
| 2020/0119895 A1* | 4/2020 | Choi | H04L 5/0042 |
| 2020/0120584 A1* | 4/2020 | Yi | H04L 5/0048 |
| 2021/0127356 A1 | 4/2021 | Agiwal | |
| 2021/0298028 A1 | 9/2021 | Matsumura et al. | |
| 2021/0298029 A1 | 9/2021 | Liu et al. | |
| 2022/0287102 A1 | 9/2022 | Futaki et al. | |
| 2024/0040483 A1* | 2/2024 | Fan | H04W 48/16 |
| 2025/0048444 A1 | 2/2025 | Futaki et al. | |

OTHER PUBLICATIONS

U.S. Appl. No. 18/618,906, filed Mar. 27, 2024, Nagano et al.
3GPP TS 38.300 V15.2.0, (Jun. 2018), 3rd Generation Partnership Project; Technical Specification Group Radio Access Network; NR; NR and NG-RAN Overall Description; Stage 2 (Release 15), pp. 1-87.
3GPP TSG-RAN WG1 #106bis-e, R1-2110314, Denso Corporation, Reduced maximum UE bandwidth for RedCap, Oct. 11-19, 2021, e-Meeting, pp. 1-4.

\* cited by examiner

Figure 5:
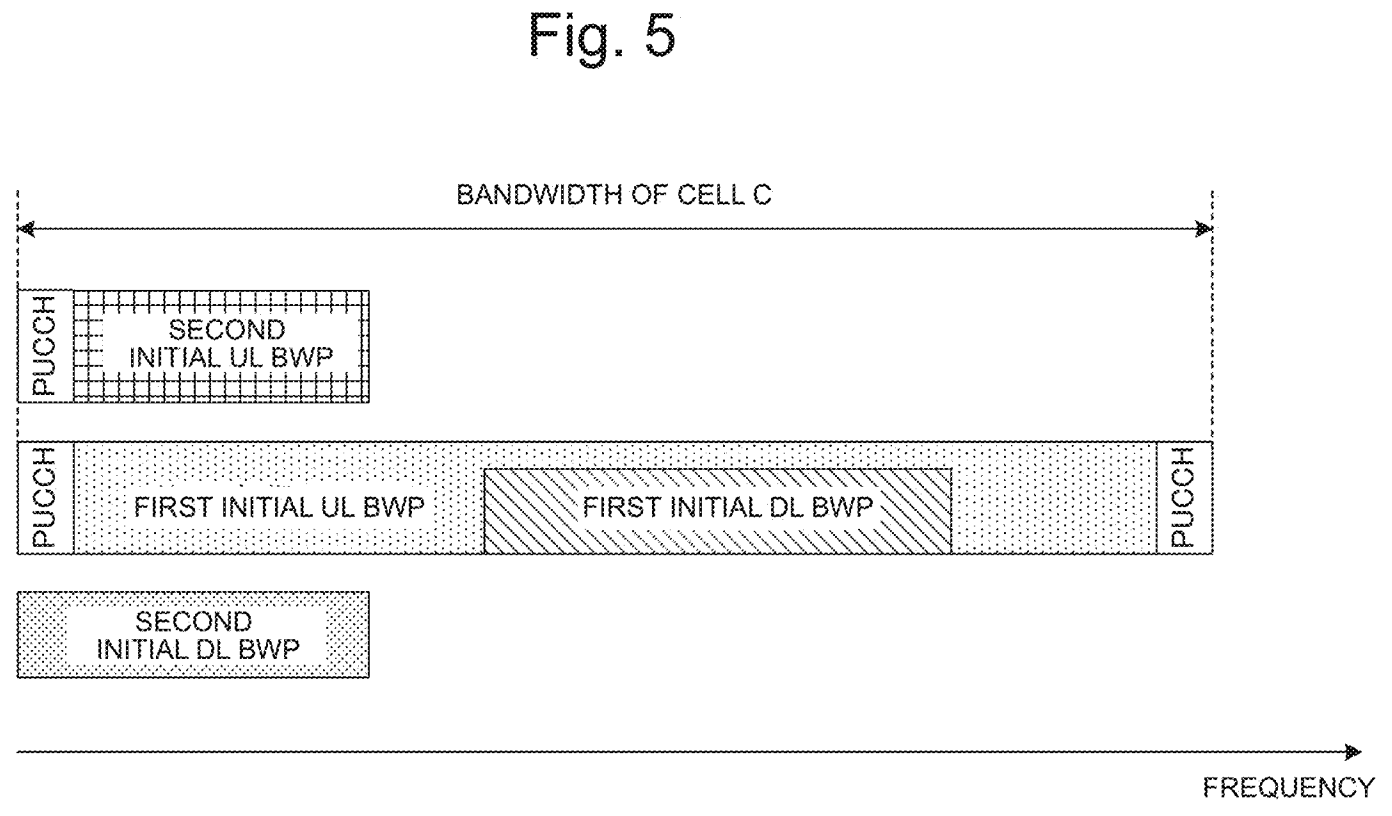

BANDWIDTH OF CELL C

SECOND INITIAL UL BWP

PUCCH

FIRST INITIAL UL BWP

PUCCH

FIRST INITIAL DL BWP

PUCCH

SECOND INITIAL DL BWP

FREQUENCY

Fig. 7

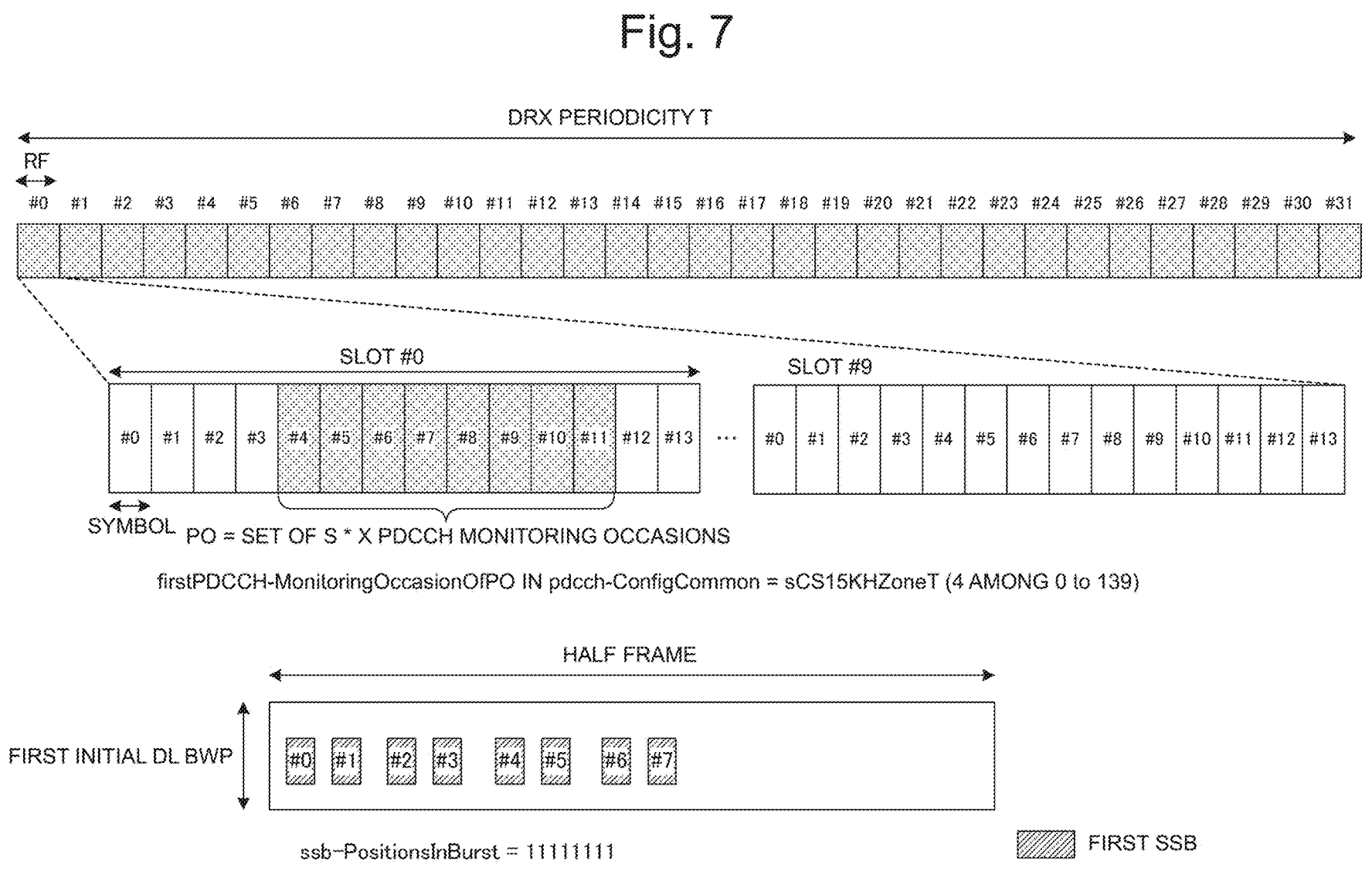

DRX PERIODICITY T

RF

0 #1 #2 #3 #4 #5 #6 #7 #8 #9 #10 #11 #12 #13 #14 #15 #16 #17 #18 #19 #20 #21 #22 #23 #24 #25 #26 #27 #28 #29 #30 #31

SLOT #0

0 #1 #2 #3 #4 #5 #6 #7 #8 #9 #10 #11 #12 #13

SLOT #9

0 #1 #2 #3 #4 #5 #6 #7 #8 #9 #10 #11 #12 #13

SYMBOL PO = SET OF S * X PDCCH MONITORING OCCASIONS firstPDCCH-MonitoringOccasionOfPO IN pdcch-ConfigCommon = sCS15KHZoneT (4 AMONG 0 to 139)

HALF FRAME

FIRST INITIAL DL BWP

0 #1 #2 #3 #4 #5 #6 #7 ssb-PositionsInBurst = 11111111

FIRST SSB

Fig. 8

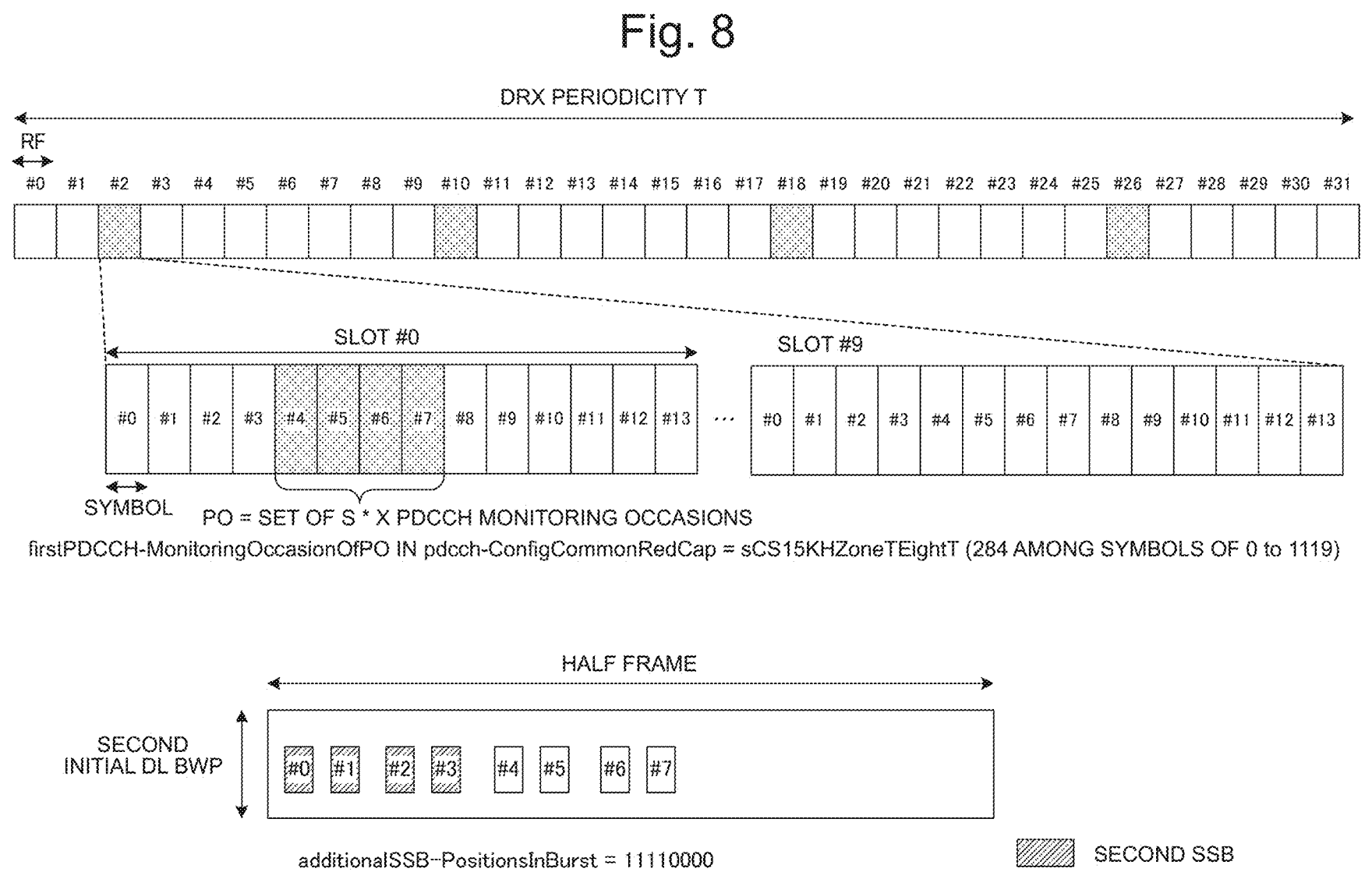

DRX PERIODICITY T

RF

0 #1 #2 #3 #4 #5 #6 #7 #8 #9 #10 #11 #12 #13 #14 #15 #16 #17 #18 #19 #20 #21 #22 #23 #24 #25 #26 #27 #28 #29 #30 #31

SLOT #0

0 #1 #2 #3 #4 #5 #6 #7 #8 #9 #10 #11 #12 #13

SYMBOL

SLOT #9

0 #1 #2 #3 #4 #5 #6 #7 #8 #9 #10 #11 #12 #13

PO = SET OF S * X PDCCH MONITORING OCCASIONS firstPDCCH-MonitoringOccasionOfPO IN pdcch-ConfigCommonRedCap = sCS15KHZoneTEightT (284 AMONG SYMBOLS OF 0 to 1119)

HALF FRAME

SECOND
INITIAL DL BWP

0 #1 #2 #3 #4 #5 #6 #7 additionalSSB–PositionsInBurst = 11110000

SECOND SSB

Fig. 13

MIB

```
-- ASN1START
-- TAG-MIB-START
MIB ::=                          SEQUENCE {
    systemFrameNumber                BIT STRING (SIZE (6)),
    subCarrierSpacingCommon          ENUMERATED {scs15or60, scs30or120},
    ssb-SubcarrierOffset             INTEGER (0..15),
    dmrs-TypeA-Position              ENUMERATED {pos2, pos3},
    pdcch-ConfigSIB1                 PDCCH-ConfigSIB1,
    cellBarred                       ENUMERATED {barred, notBarred},
    intraFreqReselection             ENUMERATED {allowed, notAllowed},
    spare                            BIT STRING (SIZE (1))
}
-- TAG-MIB-STOP
-- ASN1STOP
```

MIB FIELD DESCRIPTION cellBarred
Value *barred* means that the cell is barred, as defined in TS 38.304 [20]. This field is ignored by IAB-MT.

dmrs-TypeA-Position
Position of (first) DM-RS for downlink (see TS 38.211 [16], clause 7.4.1.1.2) and uplink (see TS 38.211 [16], clause 6.4.1.1.3).

intraFreqReselection
Controls cell selection/reselection to intra-frequency cells when the highest ranked cell is barred, or treated as barred by the UE, as specified in TS 38.304 [20]. This field is ignored by IAB-MT.

pdcch-ConfigSIB1
Determines a common *ControlResourceSet* (CORESET), a common search space and necessary PDCCH parameters. If the field *ssb-SubcarrierOffset* indicates that *SIB1* is absent, the field *pdcch-ConfigSIB1* indicates the frequency positions where the UE may find SS/PBCH block with *SIB1* or the frequency range where the network does not provide SS/PBCH block with *SIB1* (see TS 38.213 [13], clause 13).

ssb-SubcarrierOffset
Corresponds to $k_{SSB}$ (see TS 38.213 [13]), which is the frequency domain offset between SSB and the overall resource block grid in number of subcarriers. (See TS 38.211 [16], clause 7.4.3.1).
For operation with shared spectrum channel access (see 37.213 [48]), this field corresponds to, and $k_{SSB}$ is obtained from (see TS 38.211 [16], clause 7.4.3.1); the LSB of this field is used also for deriving the QCL relation between SS/PBCH blocks as specified in TS 38.213 [13], clause 4.1.
The value range of this field may be extended by an additional most significant bit encoded within PBCH as specified in TS 38.213 [13].
This field may indicate that this cell does not provide *SIB1* and that there is hence no CORESET#0 configured in *MIB* (see TS 38.213 [13], clause 13). In this case, the field *pdcch-ConfigSIB1* may indicate the frequency positions where the UE may (not) find a SS/PBCH with a control resource set and search space for *SIB1* (see TS 38.213 [13], clause 13).

subCarrierSpacingCommon
Subcarrier spacing for SIB1, Msg.2/4 for initial access, paging and broadcast SI-messages. If the UE acquires this *MIB* on an FR1 carrier frequency, the value *scs15or60* corresponds to 15 kHz and the value *scs30or120* corresponds to 30 kHz. If the UE acquires this *MIB* on an FR2 carrier frequency, the value *scs15or60* corresponds to 60 kHz and the value *scs30or120* corresponds to 120 kHz. For operation with shared spectrum channel access (see 37.213 [48]), the subcarrier spacing for SIB1 is same as that for the corresponding SSB and this field instead is used for deriving the QCL relation between SS/PBCH blocks as specified in TS 38.213 [13], clause 4.1.

systemFrameNumber
The 6 most significant bits (MSB) of the 10-bit System Frame Number (SFN). The 4 LSB of the SFN are conveyed in the PBCH transport block as part of channel coding (i.e. outside the *MIB* encoding), as defined in clause 7.1 in TS 38.212 [17].

Fig. 15

*BWP-DownlinkCommon*

```
-- ASN1START
-- TAG-BWP-DOWNLINKCOMMON-START
BWP-DownlinkCommon ::=          SEQUENCE {
    genericParameters              BWP,
    pdcch-ConfigCommon             SetupRelease { PDCCH-ConfigCommon }      OPTIONAL,   -- Need M
    pdsch-ConfigCommon             SetupRelease { PDSCH-ConfigCommon }      OPTIONAL,   -- Need M
    ...,
    [[
    genericParametersRedCap-r17    BWP2
    pdcch-ConfigCommonRedCap-r17   SetupRelease { PDCCH-ConfigCommon }      OPTIONAL,   -- Cond RedCap
    pdsch-ConfigCommonRedCap-r17   SetupRelease { PDSCH-ConfigCommon }      OPTIONAL,   -- Cond RedCap
    additionalSSB-Frequency-r17    ARFCN-ValueNR                           OPTIONAL,   -- Cond RedCap
    additionalSSB-PositionsInBurst-r17
                                   SEQUENCE {
        inOneGroup-r17                 BIT STRING (SIZE (8)),
        groupPresence-r17              BIT STRING (SIZE (8))                OPTIONAL,   -- Cond FR2-Only
    }                                                                      OPTIONAL,   -- Cond additionalSSB
    additionalSSB-PeriodicityServingCell-r17  ENUMERATED {ms5, ms10, ms20, ms40, ms80, ms160}
                                                                           OPTIONAL,   -- Cond additionalSSB
    additional-SS-PBCH-BlockPower-r17  INTEGER (-60..50)                   OPTIONAL,   -- Cond additionalSSB
    additionalSSB-SMTC-r17             SSB-MTC                             OPTIONAL,   -- Cond additionalSSB
    ]]
}
-- TAG-BWP-DOWNLINKCOMMON-STOP
-- ASN1STOP
```

*additionalSSB-Frequency*
Indicates the frequency of the additional SSB associated to this BWP. Frequencies are considered to be on the sync raster if they are also identifiable with a GSCN value (see TS 38.101-1 [15]).

*additionalSSB-PositionsInBurst*
Time domain positions of the transmitted SS-blocks in an SS-burst as defined in TS 38.213 [13], clause 4.1. If this field is absent, and *additionalSSB-Frequency* is present in BWP-DownlinkCommon, the same time domain positions as indicated by ssb-PositionsInBurst in ServingCellConfigCommonSIB is applied for the additional SSB.

*additionalSSB-PeriodicityServingCell*
SSB periodicity of the additional SSB associated to this BWP. If this field is absent, and *additionalSSB-Frequency* is present in BWP-DownlinkCommon, the same SSB periodicity as indicated by ssb-PeriodicityServingCell in ServingCellConfigCommonSIB is applied for the additional SSB.

*additional-SS-PBCH-BlockPower*
Average EPRE of the resources elements that carry secondary synchronization signals in dBm that the NW used for the additional SSB transmission, see TS 38.213 [13], clause 7. If this field is absent, and *additionalSSB-Frequency* is present in BWP-DownlinkCommon, the same average EPRE as indicated by ss-PBCH-BlockPower in ServingCellConfigCommonSIB is applied for the additional SSB.

*additionalSSB-SMTC*
Measurement timing configuration for the additional SSB. If this field is absent, the UE assumes that SSB periodicity is 5 ms for the intra-frequency cells.

*pdcch-ConfigCommonRedCap*
Cell specific parameters for the PDCCH of this BWP for RedCap UEs. This field is absent for a dormant BWP.

*pdsch-ConfigCommonRedCap*
Cell specific parameters for the PDSCH of this BWP for RedCap UEs.

| Conditional Presence | Explanation |
|---|---|
| additionalSSB | This field is optionally present. Need S, if additionalSSB-Frequency is present in BWP-DownlinkCommon. It is absent otherwise. |
| FR2-Only | This field is mandatory present for an FR2 carrier frequency. It is absent otherwise and UE releases any configured value. |
| RedCap | This field is mandatory present, Need M, if the cell supports access from RedCap UEs. It is absent otherwise. |
| RedCap2 | This field is optionally present. Need M, if the cell supports access from RedCap UEs. It is absent otherwise. |

Fig. 16

BWP-UplinkCommon

```
-- ASN1START
-- TAG-BWP-UPLINKCOMMON-START
BWP-UplinkCommon ::=          SEQUENCE {
    genericParameters             BWP,
    rach-ConfigCommon             SetupRelease { RACH-ConfigCommon }       OPTIONAL,   -- Need M
    pusch-ConfigCommon            SetupRelease { PUSCH-ConfigCommon }      OPTIONAL,   -- Need M
    pucch-ConfigCommon            SetupRelease { PUCCH-ConfigCommon }      OPTIONAL,   -- Need M
    ...,
    [[
    rach-ConfigCommonIAB-r16      SetupRelease { RACH-ConfigCommon }       OPTIONAL,   -- Need M
    useInterlacePUCCH-PUSCH-r16   ENUMERATED {enabled}                     OPTIONAL,   -- Need R
    msgA-ConfigCommon-r16         SetupRelease { MsgA-ConfigCommon-r16 }   OPTIONAL    -- Cond SpCellOnly2
    ]],
    [[
    genericParametersRedCap-r17   BWP                                      OPTIONAL,   -- Cond RedCap
    rach-ConfigCommonRedCap-r17   SetupRelease { RACH-ConfigCommon }       OPTIONAL,   -- Cond RedCap
    pusch-ConfigCommonRedCap-r17  SetupRelease { PUSCH-ConfigCommon }      OPTIONAL,   -- Cond RedCap
    pucch-ConfigCommonRedCap-r17  SetupRelease { PUCCH-ConfigCommon }      OPTIONAL,   -- Cond RedCap
    msgA-ConfigCommonRedCap-r17   SetupRelease { MsgA-ConfigCommon-r16 }   OPTIONAL    -- Cond RedCap
    ]]
}
-- TAG-BWP-UPLINKCOMMON-STOP
-- ASN1STOP
```

*msgA-ConfigCommonRedCap*
Configuration of the cell specific PRACH and PUSCH resource parameters for transmission of MsgA in 2-step random access type procedure for RedCap UEs. The NW can configure *msgA-ConfigCommon* only for UL BWPs if the linked DL BWPs (same bwp-Id as UL-BWP) are the initial DL BWPs or DL BWPs containing the SSB associated to the initial BL BWP. If the additional SSB (i.e. non-cell defining SSB) is configured for the linked DL BWP, the cell specific PRACH parameters relevant to SSB are associated with the additional SSB. Otherwise, it is associated with the cell defining SSB.

*pucch-ConfigCommonRedCap*
Cell specific parameters for the PUCCH of this BWP for RedCap UEs.

*pusch-ConfigCommonRedCap*
Cell specific parameters for the PUSCH of this BWP for RedCap UEs.

*rach-ConfigCommonRedCap*
Configuration of cell specific random access parameters which the RedCap UE uses for contention based and contention free random access as well as for contention based beam failure recovery in this BWP. The NW configures SSB-based RA (and hence *RACH-ConfigCommon*) only for UL BWPs if the linked DL BWPs (same bwp-Id as UL-BWP) are the initial DL BWPs or DL BWPs containing the SSB associated to the initial DL BWP. The network configures *rach-ConfigCommon*, whenever it configures contention free random access (for reconfiguration with sync or for beam failure recovery). If the additional SSB (i.e. non-cell defining SSB) is configured for the linked DL BWP, the cell specific PRACH parameters relevant to SSB are associated with the additional SSB. Otherwise, it is associated with the cell defining SSB.

| Conditional Presence | Explanation |
|---|---|
| RedCap | The field is mandatory present, Need M, if the cell supports access from RedCap UEs. It is absent otherwise. |

Fig. 17

RACH-ConfigCommon

```
-- ASN1START
-- TAG-RACH-CONFIGCOMMON-START

RACH-ConfigCommon ::=           SEQUENCE {
    rach-ConfigGeneric              RACH-ConfigGeneric,
    totalNumberOfRA-Preambles       INTEGER (1..63)                OPTIONAL,    -- Need S
    ssb-perRACH-OccasionAndCB-PreamblesPerSSB   CHOICE {
        oneEighth   ENUMERATED {n4,n8,n12,n16,n20,n24,n28,n32,n36,n40,n44,n48,n52,n56,n60,n64},
        oneFourth   ENUMERATED {n4,n8,n12,n16,n20,n24,n28,n32,n36,n40,n44,n48,n52,n56,n60,n64},
        oneHalf     ENUMERATED {n4,n8,n12,n16,n20,n24,n28,n32,n36,n40,n44,n48,n52,n56,n60,n64},
        one         ENUMERATED {n4,n8,n12,n16,n20,n24,n28,n32,n36,n40,n44,n48,n52,n56,n60,n64},
        two         ENUMERATED {n4,n8,n12,n16,n20,n24,n28,n32},
        four        INTEGER (1..16),
        eight       INTEGER (1..8),
        sixteen     INTEGER (1..4)
    },
    ...
    rsrp-ThresholdSSB               RSRP-Range                    OPTIONAL,    -- Need M
    ...
}
                                                                  OPTIONAL,    -- Need R

-- TAG-RACH-CONFIGCOMMON-STOP
-- ASN1STOP
```

*rsrp-ThresholdSSB*
UE may select the SS block and corresponding PRACH resource for path-loss estimation and (re)transmission based on SS blocks that satisfy the threshold (see TS 38.213 [13]). If the additional SSB (i.e. non-cell defining SSB) is configured for the linked DL BWP, the UE selects an SS block amongst additional SSBs indicated by additionalSSB-Frequency in BWP-DownlinkConfigCommon that satisfy the threshold indicated by this field for RedCap UEs. Otherwise, the UE selects an SS block amongst cell defining SSBs that satisfy the threshold indicated by this field for RedCap UEs.

*ssb-perRACH-OccasionAndCB-PreamblesPerSSB*
The meaning of this field is twofold: the CHOICE conveys the information about the number of SSBs per RACH occasion. Value *oneEighth* corresponds to one SSB associated with 8 RACH occasions, value *oneFourth* corresponds to one SSB associated with 4 RACH occasions, and so on. The ENUMERATED part indicates the number of Contention Based preambles per SSB. Value *n4* corresponds to 4 Contention Based preambles per SSB, value *n8* corresponds to 8 Contention Based preambles per SSB, and so on. The total number of CB preambles in a RACH occasion is given by CB-preambles-per-SSB * max(1, SSB-per-rach-occasion). See TS 38.213 [13]. If the additional SSB (i.e. non-cell defining SSB) is configured for the linked DL BWP, RA preambles and RACH occasions are associated with the additional SSB. Otherwise, they are associated with cell defining SSB.

Fig. 18

RACH-ConfigCommonTwoStepRA

```
-- ASN1START
-- TAG-RACH-CONFIGCOMMONTWOSTEPRA-START

RACH-ConfigCommonTwoStepRA-r16 ::=         SEQUENCE {
    rach-ConfigGenericTwoStepRA-r16            RACH-ConfigGenericTwoStepRA-r16,
    msgA-TotalNumberOfRA-Preambles-r16         INTEGER (1..63)                     OPTIONAL, -- Need S
    msgA-SSB-PerRACH-OccasionAndCB-PreamblesPerSSB-r16  CHOICE {
        oneEighth           ENUMERATED {n4,n8,n12,n16,n20,n24,n28,n32,n36,n40,n44,n48,n52,n56,n60,n64},
        oneFourth           ENUMERATED {n4,n8,n12,n16,n20,n24,n28,n32,n36,n40,n44,n48,n52,n56,n60,n64},
        oneHalf             ENUMERATED {n4,n8,n12,n16,n20,n24,n28,n32,n36,n40,n44,n48,n52,n56,n60,n64},
        one                 ENUMERATED {n4,n8,n12,n16,n20,n24,n28,n32,n36,n40,n44,n48,n52,n56,n60,n64},
        two                 ENUMERATED {n4,n8,n12,n16,n20,n24,n28,n32,n36,n40,n44,n48,n52,n56,n60,n64},
        four                INTEGER (1..16),
        eight               INTEGER (1..8),
        sixteen             INTEGER (1..4)
    },
    2StepOnly
    msgA-CB-PreamblesPerSSB-PerSharedRO-r16    INTEGER (1..60)                     OPTIONAL, -- Cond
    SharedRO
    msgA-SSB-SharedRO-MaskIndex-r16            INTEGER (1..15)                     OPTIONAL, -- Need S
    ...
    msgA-RSRP-Threshold-r16                    RSRP-Range                          OPTIONAL, -- Cond
    2Step4Step
    msgA-RSRP-ThresholdSSB-r16                 RSRP-Range                          OPTIONAL, -- Need R
    ...
}

-- TAG-RACH-CONFIGCOMMONTWOSTEPRA-STOP
-- ASN1STOP
```

*msgA-RSRP-ThresholdSSB*
UE may select the SS block and corresponding PRACH resource for path-loss estimation and (re)transmission based on SS blocks that satisfy the threshold (see TS 38.213 [13]). If the additional SSB (i.e. non-cell defining SSB) is configured for the linked DL BWP, the UE selects an SS block amongst additional SSBs indicated by additionalSSB-Frequency in BWP-DownlinkConfigCommon that satisfy the threshold indicated by this field for RedCap UEs. Otherwise, the UE selects an SSB amongst cell defining SSBs that satisfy the threshold indicated by this field for RedCap UEs.

*msgA-SSB-PerRACH-OccasionAndCB-PreamblesPerSSB*
The meaning of this field is twofold: the CHOICE conveys the information about the number of SSBs per RACH occasion. *Value oneEight corresponds to one SSB associated with 8 RACH occasions,* value *oneFourth* corresponds to one SSB associated with 4 RACH occasions, and so on. The ENUMERATED part indicates the number of Contention Based preambles per SSB. Value *n4* corresponds to 4 Contention Based preambles per SSB, value *n8* corresponds to 8 Contention Based preambles per SSB, and so on. The total number of CB preambles in a RACH occasion is given by *CB-preambles-per-SSB* * max(1, *SSB-per-rach-occasion*). If the field is not configured and both 2-step and 4-step are configured for the BWP, the UE applies the value in the field *ssb-perRACH-OccasionAndCB-PreamblesPerSSB in RACH-ConfigCommon.* The field is not present when RACH occasions are shared between 2-step and 4-step type random access in the BWP. If the additional SSB (i.e. non-cell defining SSB) is configured for the linked DL BWP, RA preambles and RACH occasions are associated with the additional SSB. Otherwise, they are associated with cell defining SSB.

Fig. 21

TERMINAL, BASE STATION, AND WIRELESS COMMUNICATION METHOD

CROSS-REFERENCE TO RELATED APPLICATION

This application is a continuation application of International Patent Application No. PCT/JP2022/036744, filed Sep. 30, 2022, which designated the U.S. and claims the benefit of priority to Japanese Patent Application No. 2021-162296 filed on Sep. 30, 2021. The entire contents of the above applications are incorporated herein by reference.

TECHNICAL FIELD

The present disclosure relates to a terminal, a base station, and a wireless communication method.

BACKGROUND

In the Third Generation Partnership Project (3GPP) which is an international standardization body, a specification of Release 15 corresponding to new radio (NR) which is a fifth generation (5G) radio access technology (RAT) has been developed as a successor of long term evolution (LTE) which is a 3.9th generation RAT and LTE-Advanced which is a fourth generation RAT, for example, 3GPP TS 38.300 V15.2.0 (2018-06). LTE and/or LTE-Advanced is also called evolved universal terrestrial radio access (E-UTRA).

SUMMARY

In 3GPP (for example, in Release 17 which defines NR), supporting a terminal (hereinafter, referred to as a "reduced capability (RedCap) terminal") that is assumed to have lower performance and a lower price range than a terminal (hereinafter, referred to as an "existing terminal") introduced in Release 15 or 16 has been studied. Specifically, enabling an initial downlink bandwidth part (initial DL BWP) for the RedCap terminal to be newly configured in a cell in which the initial DL BWP is configured has been studied. In addition, transmitting a synchronization signal block (SSB) in the initial DL BWP for the RedCap terminal has also been studied.

However, in a case where an initial DL BWP (hereinafter, referred to as a "second initial DL BWP") is configured separately from the existing initial DL BWP (hereinafter, referred to as a "first initial DL BWP) in the cell and the SSB may also be transmitted in the second initial DL BWP, the terminal may not be able to suitably control an operation based on the SSB. The operation based on the SSB is assumed to be, for example, an operation of determining a given period (hereinafter, referred to as a "PDCCH monitoring occasion") to be used for monitoring a downlink control channel for paging.

An object of the present disclosure is to provide a terminal and a wireless communication method capable of suitably controlling an operation related to paging.

A terminal according to an aspect of the present disclosure includes a reception unit that receives system information including information used for configuring a first initial downlink bandwidth part, cell-specific information related to configuration of a physical downlink control channel in the first initial downlink bandwidth part, information used for configuring a second initial downlink bandwidth part, and cell-specific information related to configuration of a physical downlink control channel in the second initial downlink bandwidth part, and a control unit that, in a case where an identifier of a search space for paging is included in the cell-specific information related to configuration of the physical downlink control channel in the second initial downlink bandwidth part, determines a monitoring occasion of a physical downlink control channel for paging based on information related to a synchronization signal and physical broadcast channel (SS/PBCH) block transmitted in the second initial downlink bandwidth part and on the identifier of the search space.

A base station according to another aspect of the present disclosure includes a transmission unit that transmits system information including information used for configuring a first initial downlink bandwidth part, cell-specific information related to configuration of a physical downlink control channel in the first initial downlink bandwidth part, information used for configuring a second initial downlink bandwidth part, and cell-specific information related to configuration of a physical downlink control channel in the second initial downlink bandwidth part, and a control unit that, in a case where an identifier of a search space for paging is included in the cell-specific information related to configuration of the physical downlink control channel in the second initial downlink bandwidth part, configures a monitoring occasion of a physical downlink control channel for paging based on information related to a synchronization signal and physical broadcast channel (SS/PBCH) block transmitted in the second initial downlink bandwidth part and on the identifier of the search space.

A wireless communication method of a terminal according to still another aspect of the present disclosure includes a step of receiving system information including information used for configuring a first initial downlink bandwidth part, cell-specific information related to configuration of a physical downlink control channel in the first initial downlink bandwidth part, information used for configuring a second initial downlink bandwidth part, and cell-specific information related to configuration of a physical downlink control channel in the second initial downlink bandwidth part, and a step of, in a case where an identifier of a search space for paging is included in the cell-specific information related to configuration of the physical downlink control channel in the second initial downlink bandwidth part, determining a monitoring occasion of a physical downlink control channel for paging based on information related to a synchronization signal and physical broadcast channel (SS/PBCH) block transmitted in the second initial downlink bandwidth part and on the identifier of the search space.

A wireless communication method of a base station according to still another aspect of the present disclosure includes a step of transmitting system information including information used for configuring a first initial downlink bandwidth part, cell-specific information related to configuration of a physical downlink control channel in the first initial downlink bandwidth part, information used for configuring a second initial downlink bandwidth part, and cell-specific information related to configuration of a physical downlink control channel in the second initial downlink bandwidth part, and a step of, in a case where an identifier of a search space for paging is included in the cell-specific information related to configuration of the physical downlink control channel in the second initial downlink bandwidth part, configuring a monitoring occasion of a physical downlink control channel for paging based on information related to a synchronization signal and physical broadcast channel (SS/PBCH) block transmitted in the second initial downlink bandwidth part and on the identifier of the search space.

According to an aspect of the present disclosure, an operation related to paging can be suitably controlled.

BRIEF DESCRIPTION OF DRAWINGS

FIG. 4 is a diagram illustrating an example of a BWP in the present embodiment.

FIG. 5 is a diagram illustrating an example of first and second initial DL/UP BWPs according to the present embodiment.

FIG. 7 is a diagram illustrating an example of the SSB, a PF, and a PO according to the present embodiment.

FIG. 8 is a diagram illustrating an example of the SSB, the PF, and the PO according to the present embodiment.

FIG. 13 is a diagram illustrating an example of an MIB according to the present embodiment.

FIG. 15 is a diagram illustrating an example of BWP-DownlinkCommon according to the present embodiment.

FIG. 16 is a diagram illustrating an example of BWP-UplinkCommon according to the present embodiment.

FIG. 17 is a diagram illustrating an example of RACH-ConfigCommon according to the present embodiment.

FIG. 18 is a diagram illustrating an example of RACH-ConfigCommonTwoStepRA according to the present embodiment.

FIG. 21 is a diagram illustrating a functional block configuration of a base station according to the present embodiment.

DETAILED DESCRIPTION

Hereinafter, the present embodiment will be described with reference to the accompanying drawings. For easy understanding of the description, the same constituents in each drawing will be assigned the same reference signs as much as possible, and duplicate descriptions will be omitted.

Figure 1:
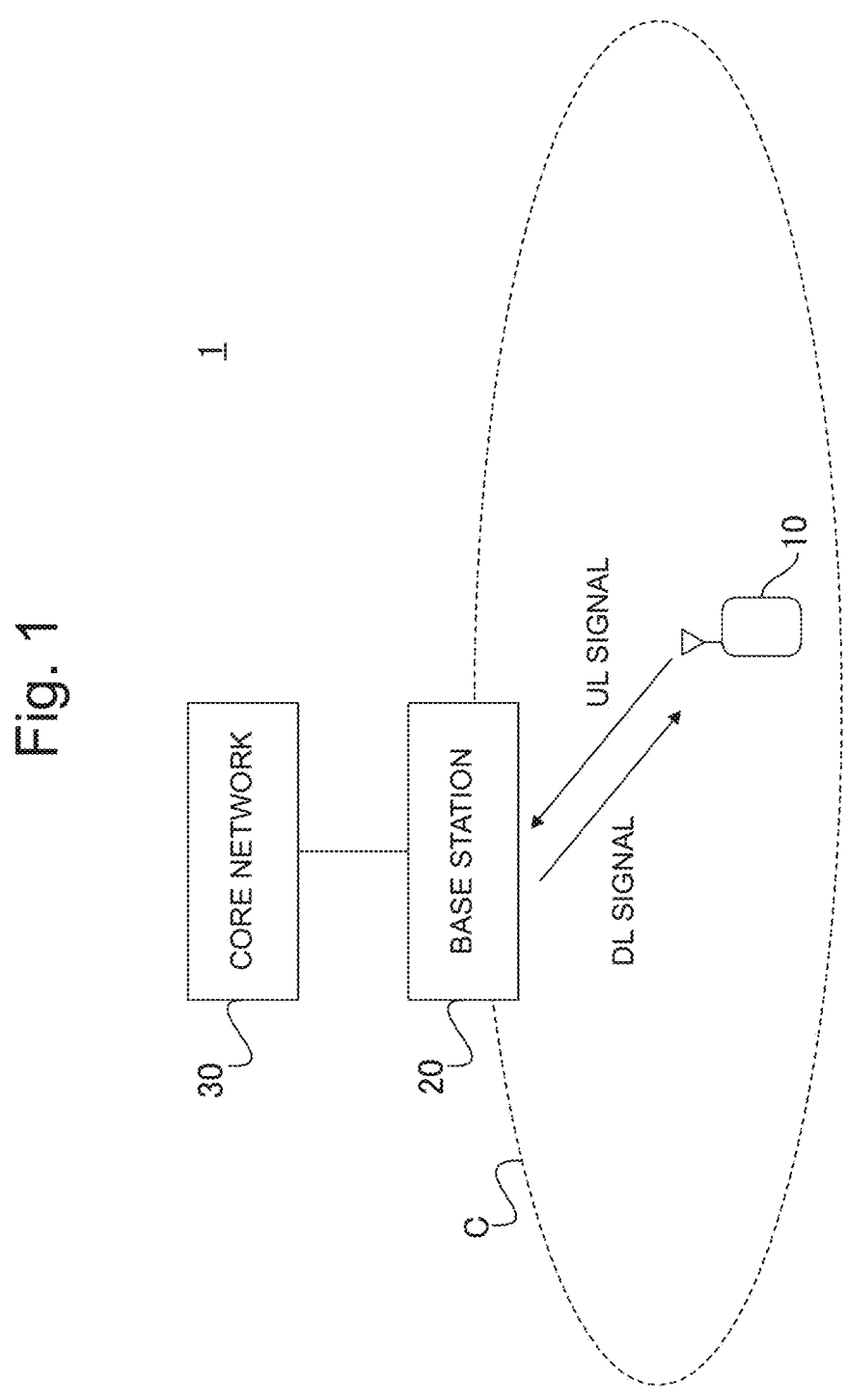
FIG. 1 is a diagram illustrating an example of a summary of a wireless communication system according to the present embodiment.

FIG. 1 is a diagram illustrating an example of a summary of a wireless communication system according to the present embodiment. As illustrated in FIG. 1, a wireless communication system 1 may include a terminal 10, a base station 20, and a core network 30. The number of terminals 10 and the number of base stations 20 illustrated in FIG. 1 are merely an example and are not limited to the illustrated numbers.

The wireless communication system 1 is a system that performs communication by complying with a radio access technology (RAT) defined by 3GPP. The radio access technology with which the wireless communication system 1 complies is assumed to be, for example, but is not limited to, a fifth generation RAT such as NR. For example, one or a plurality of RATs such as a fourth generation RAT such as LTE and LTE-Advanced and a non-3GPP RAT such as an RAT of a sixth generation or later and Wi-Fi (registered trademark) can be used. The wireless communication system 1 may be in the form of performing communication by complying with a radio access technology defined by a standard-setting body (for example, Institute of Electrical and Electronics Engineers (IEEE) and Internet Engineering Task Force (IETF)) different from 3GPP.

The terminal 10 is an apparatus corresponding to a terminal (for example, user equipment (UE)) defined in the 3GPP specification. The terminal 10 is, for example, a given terminal or apparatus such as a smartphone, a personal computer, a vehicle, a vehicle-mounted terminal, a vehicle-mounted apparatus, a stationary apparatus, a telematics control unit (TCU), and an IoT device such as a sensor. The terminal 10 may be called user equipment (UE), a mobile station (MS), a user terminal, a radio apparatus, a subscriber terminal, an access terminal, or the like. In addition, the terminal 10 may be a so-called reduced capability (RedCap) terminal and may be, for example, an industrial wireless sensor, a video surveillance camera, or a wearable device. The terminal 10 may be of a mobile type or a fixed type. For example, the terminal 10 is configured to be capable of performing communication using one or a plurality of RATs such as NR, LTE, LTE-Advanced, and Wi-Fi (registered trademark). The terminal 10 is not limited to a terminal defined in the 3GPP specification and may be a terminal complying with a standard defined by other standard-setting bodies. In addition, the terminal 10 may not be a terminal complying with a standard.

The base station 20 is an apparatus corresponding to a base station (for example, a gNodeB (gNB) or an eNB) defined in the 3GPP specification. The base station 20 forms one or more cells C and communicates with the terminal 10 using the cell. The cell C may be replaced with a serving cell, a carrier, a component carrier (CC), or the like. In addition, the cell C may have a given bandwidth. For example, the base station 20 may communicate with the terminal 10 using one or more cell groups. Each cell group may include one or more cells C. Unifying a plurality of cells C in a cell group is called carrier aggregation. The plurality of cells C may include a primary cell (PCell) or a primary secondary cell group (SCG) cell (PSCell), and one or more secondary cells (SCGs). In addition, communicating with the terminal 10 using two cell groups is called dual connectivity. The terminal 10 is not limited to a base station defined in the 3GPP specification and may be a terminal complying with a standard defined by other standard-setting bodies. In addition, the terminal 10 may not be a base station complying with a standard.

The base station 20 may be called a gNodeB (gNB), an en-gNB, a next generation-radio access network (NG-RAN) node, a low-power node, a central unit (CU), a distributed unit (DU), a gNB-DU, a remote radio head (RRH), an integrated access and backhaul/backhauling (IAB) node, an access point, or the like. The base station 20 is not limited to one node and may be configured with a plurality of nodes (for example, a combination of a lower node such as a DU and a higher node such as a CU).

The core network 30 is, for example, but is not limited to, a fifth generation core network (5G core network (5GC)) or a fourth generation core network (evolved packet core (EPC)). An apparatus on the core network 30 (hereinafter, referred to as a "core network apparatus") may perform mobility management such as paging and location registration of the terminal 10. The core network apparatus may be connected to the base station 20 or to the terminal 10 through a given interface (for example, an S1 or NG interface).

The core network apparatus may include, for example, at least one of an access and mobility management function (AMF) of managing information about a C plane (for example, information related to access, mobility management, and the like) or a user plane function (UPF) of performing a transmission control of information about a U plane (for example, user data).

In the wireless communication system 1, the terminal 10 receives a downlink (DL) signal from the base station 20 and/or transmits an uplink (UL) signal to the base station 20. In the terminal 10, one or more cells C are configured, and at least one of the configured cells is activated. The maximum bandwidth of each cell is, for example, 20 MHz or 400 MHz.

In addition, the terminal 10 performs a cell search based on a synchronization signal (for example, a primary synchronization signal (PSS) and/or a secondary synchronization signal (SSS)) from the base station 20. The cell search is a procedure for the terminal 10 to acquire time and frequency synchronization with the cell and detect an identifier (for example, a physical layer cell ID) of the cell.

The terminal 10 determines a search space set and/or a control resource set (CORESET) based on parameters (hereinafter, referred to as "RRC parameters") included in a radio resource control (RRC) message. The CORESET may be configured with a frequency domain resource (for example, a given number of resource blocks) and a time domain resource (for example, a given number of symbols). The RRC parameters may be called RRC information elements (IEs) or the like.

The terminal 10 monitors downlink control information (DCI) transmitted through a downlink control channel (for example, a physical downlink control channel (PDCCH)) in the search space set associated with the CORESET. The RRC message may include, for example, an RRC setup message, an RRC reconfiguration message, an RRC resume message, an RRC reestablishment message, and system information.

Monitoring of the DCI means blind decoding of PDCCH candidates in the search space set with an assumed DCI format by the terminal 10. The number of bits (referred to as a size, a bit width, or the like) of the DCI format is set in advance or derived in accordance with the number of bits of fields included in the DCI format. The terminal 10 detects the DCI for the terminal 10 based on the number of bits of the DCI format and on a specific radio network temporary identifier (RNTI) used for scrambling a cyclic redundancy check (CRC) bit (referred to as a CRC parity bit) of the DCI format (hereinafter, referred to as "CRC scrambling").

Monitoring of the DCI is called PDCCH monitoring, a PDCCH monitor, or the like. In addition, a given period for monitoring the DCI or the PDCCH is called a PDCCH monitoring occasion.

The search space set is a set of one or more search spaces and may include a search space set (hereinafter, referred to as a "common search space (CSS) set") to be used in common between one or more terminals 10 and a terminal-specific search space set (UE-specific search space (USS) set). The search space set may include a search space set for the paging (hereinafter, referred to as a "paging search space"), a search space set for random access (RA) (hereinafter, referred to as an "RA search space"), a search space set for the system information (hereinafter, referred to as a "system information search space"), and the like. The terminal 10 may receive information related to a configuration of each search space set.

The terminal 10 receives (or detects) the DCI which is CRC-scrambled using the specific RNTI, by monitoring the PDCCH in the PDCCH monitoring occasion using the search space set (or the search space). The terminal 10 controls reception of a downlink shared channel (for example, a physical downlink shared channel (PDSCH)) scheduled using the DCI and/or transmission of an uplink shared channel (for example, a physical uplink shared channel (PUSCH)) scheduled using the DCI.

The system information broadcasted by the cell C may include a master information block (MIB) and/or one or more system information blocks (SIBs). The MIB is broadcasted through a broadcast channel (for example, a physical broadcast channel (PBCH)). The MIB and an SIB1 are called minimum system information, and the SIB1 is called remaining minimum system information (RMSI). An SIBx (x is any character string such as x=2, 3, . . . ) other than the SIB1 is called other system information (OSI). The SIB1 and the SIBx other than the SIB1 are broadcasted through the PDSCH. The SIB1 may be cell-specific, and the SIBx other than the SIB1 may be cell-specific or specific to an area including one or more cells.

SSB

An SSB is a block including the synchronization signal and at least one of the PBCH or a demodulation reference signal (DM-RS) of the PBCH. The SSB may be called an SS/PBCH block, an SS block, or the like.

Figure 2:
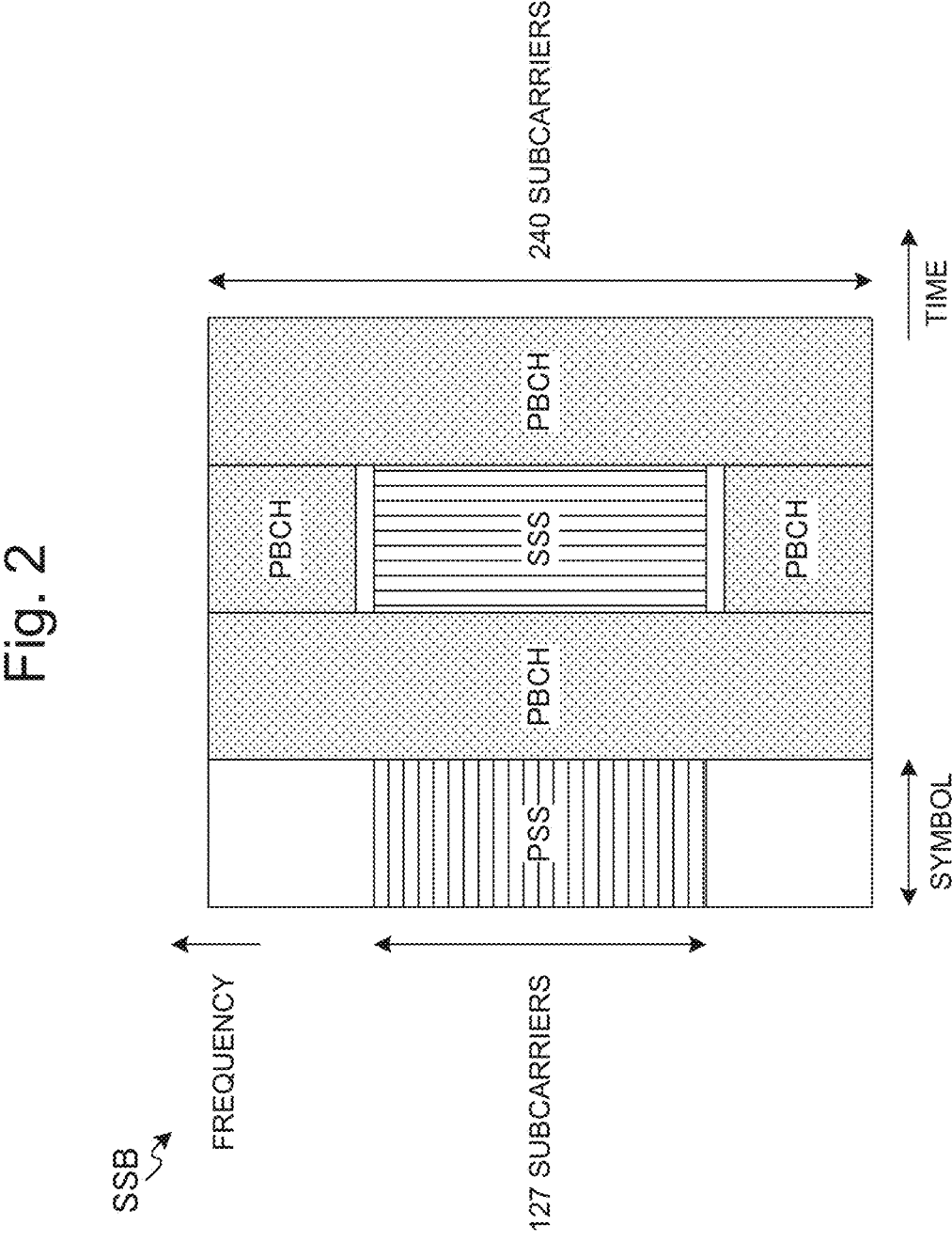
FIG. 2 is a diagram illustrating an example of an SSB according to the present embodiment.

FIG. 2 is a diagram illustrating an example of the SSB according to the present embodiment. FIG. 2 is merely an example, and the SSB is not limited to the illustration. As illustrated in FIG. 2, the SSB may be configured with a given number of symbols (for example, four consecutive symbols) as the time domain resource and a given number of subcarriers (for example, 240 consecutive subcarriers) as the frequency domain resource.

For example, in FIG. 2, the PSS is transmitted using the first symbol in the SSB and is mapped to 127 subcarriers. The remaining subcarriers of the first symbol may be empty. The SSS is transmitted using the third symbol in the SSB and is mapped to the same 127 subcarriers as the PSS. A given number (eight or nine) of empty subcarriers may be provided at both ends of the SSS. The PBCH is transmitted using the second and fourth symbols in the SSB and is mapped to 240 subcarriers. In addition, the PBCH is mapped to 48 subcarriers at both ends of the SSS. Different types of numerology (for example, subcarrier spacing=15, 30, 120, or 240 kHz) can be applied to the SSB. The DMRS, not illustrated, may be mapped to a part of the subcarriers illustrated as the PBCH in FIG. 3.

An SS burst set which is a set of one or more SSBs is transmitted with a given periodicity. The SS burst set may be called an SS burst or the like. The terminal 10 receives information (hereinafter, referred to as "ssb-periodicityServingCell") related to the periodicity of the SSB or the SS burst set (hereinafter, referred to as an "SSB periodicity"). ssb-periodicityServingCell may indicate the SSB periodicity (for example, 5, 10, 20, 40, 80, or 160 ms).

Each SSB in the SS burst set is identified by an index (hereinafter, referred to as an "SSB index"). In the case of multi-beam operation, SSBs having different indexes in the SS burst set correspond to different beams and may be transmitted by sequentially switching a beam direction via beam sweeping. In the case of single-beam operation, an SSB (one or a plurality of SSBs) having a specific index in the SS burst set may be transmitted in all directions.

The terminal 10 receives information (hereinafter, referred to "ssb-PositionsInBurst") related to SSB transmission in the SS burst set. For example, ssb-PositionsInBurst is a bitmap including bits corresponding to each SSB in the SS burst set, and a value of each bit may indicate whether the corresponding SSB is actually transmitted. For example, a bit value "1" may indicate that the corresponding SSB is actually transmitted, and a bit value "0" may indicate that the corresponding SSB is not actually transmitted. ssb-PositionsInBurst is not limited to the above and may be any information related to SSB transmission in the SS burst set. ssb-PositionsInBurst may be cell-specific. In addition, while ssb-PositionsInBurst is included in, for example, the SIB1, ssb-PositionsInBurst may be included in other RRC messages.

Figure 3:
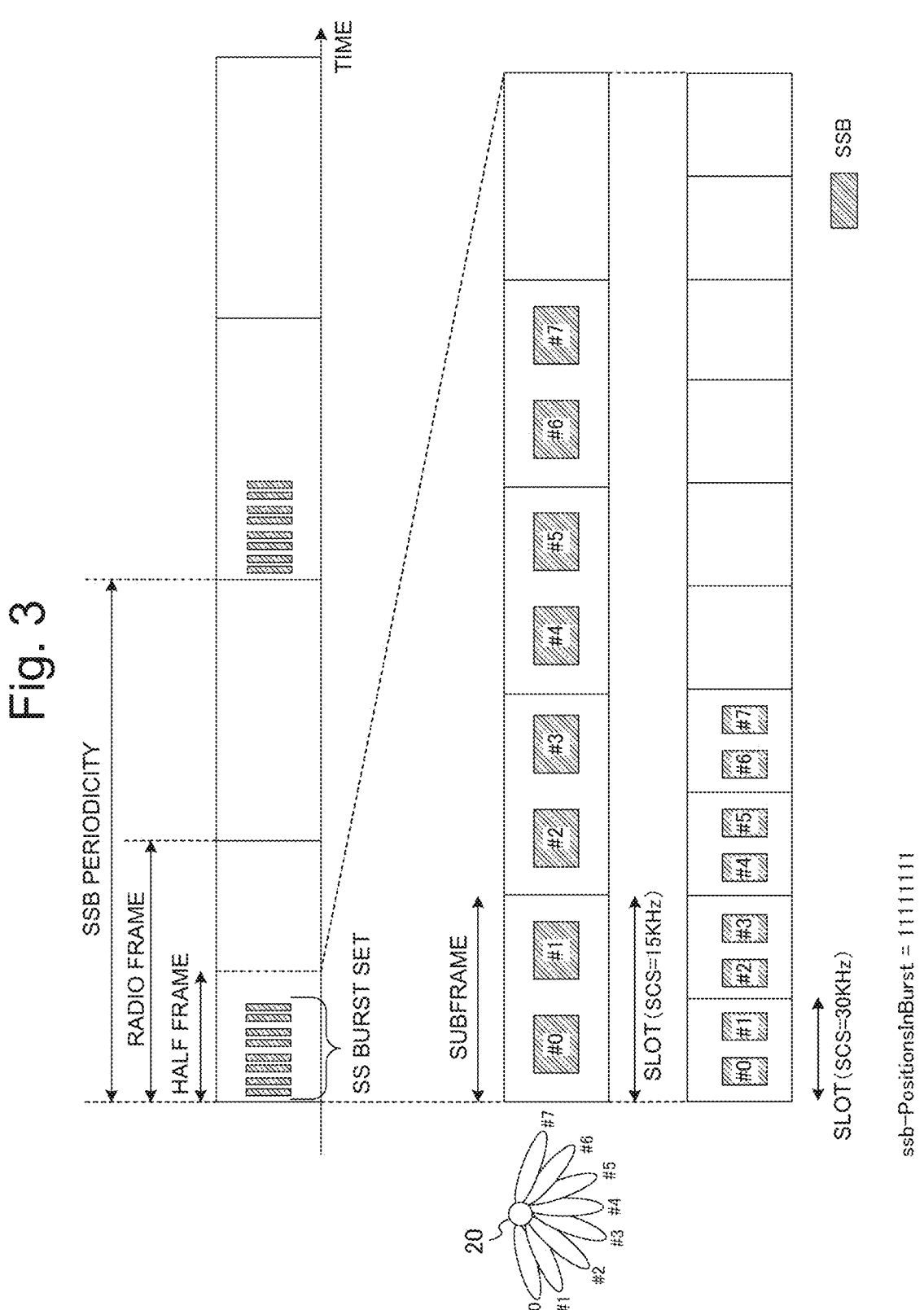
FIG. 3 is a diagram illustrating an example of an SS burst set according to the present embodiment.

FIG. 3 is a diagram illustrating an example of the SS burst set according to the present embodiment. FIG. 3 is merely an example, and the number of SSBs in the SS burst set, the SSB periodicity, the subcarrier spacing, the beam direction, a location at which the SS burst set is positioned, and the like are not limited to the illustration. For example, in FIG. 3, SSBs #0 to #7 in the SS burst set are transmitted from the base station 20 at different times using beams #0 to #7 having different directivity from each other.

The SS burst set including one or more SSBs is positioned in a half frame (for example, 5 ms) of the first half or the second half of a radio frame and is repeated with the SSB periodicity. For example, in FIG. 3, the SS burst set including SSBs #0 to #7 is positioned in the half frame of the first half of the radio frame and is repeated with the SSB periodicity of 20 ms. As illustrated in FIG. 3, locations at which SSBs #0 to #7 are transmitted in the half frame may vary depending on the subcarrier spacing.

In addition, for example, in FIG. 3, ssb-PositionsInBurst is a bitmap of 8 bits corresponding to SSBs #0 to #7, respectively, and is set to "11111111". Thus, the terminal 10 recognizes that all of SSBs #0 to #7 in the SS burst set are transmitted. In this manner, the terminal 10 determines the SSB actually transmitted in the SS burst set based on ssb-PositionsInBurst.

While an example of the multi-beam operation is illustrated in FIG. 3, the same can be applied to the case of the single-beam operation. In the case of the single-beam operation, a specific SSB (for example, only SSB #0) may be transmitted in all directions. The bit corresponding to the specific SSB in ssb-PositionsInBurst may be set to "1", and the other bits may be set to "0".

BWP

One or a plurality of bandwidth parts (BWPs) may be configured for one cell C. The BWP may include a BWP for the DL (hereinafter, referred to as a "DL BWP") and/or a BWP for the UL (hereinafter, referred to as a "UL BWP"). In addition, the BWP may include a BWP (hereinafter, referred to as an "initial BWP") configured to be cell-specific and a BWP (hereinafter, referred to as a "dedicated BWP") configured to be specific to the terminal 10. The initial BWP may be used for initial access and/or be common to one or more terminals 10. The initial BWP may include an initial BWP for the DL (hereinafter, referred to as an "initial DL BWP") and an initial BWP for the UL (hereinafter, referred to as an "initial UL BWP"). The dedicated BWP is called a "UE-specific BWP".

The initial DL BWP and/or the initial UL BWP (hereinafter, referred to as the "initial DL/UL BWP") may be equal to CORESET #0 that is determined based on a specific parameter (hereinafter, referred to as "pdcch-ConfigSIB1") in the MIB. Alternatively, the initial DL/UL BWP may be configured in the terminal 10 based on information (hereinafter, referred to as "initial DL/UL BWP information") related to the initial DL/UL BWP received by the terminal 10 from the base station 20. The initial DL/UL BWP information may include at least one of information (hereinafter, referred to as "locationAndBandwidth") indicating a location and/or a bandwidth of the initial DL/UL BWP in the frequency domain, information (hereinafter, referred to as "subcarrierSpacing") indicating the subcarrier spacing, or information (hereinafter, referred to as "cyclicPrefix") related to a cyclic prefix. The initial DL/UL BWP information is a cell-specific RRC parameter and may be included in the SIB1 or in other RRC messages.

The initial DL BWP may be a DL BWP having a BWP identifier (hereinafter, referred to as "bwp-id")=0 (that is, DL BWP #0), and the initial UL BWP may be a UL BWP having bwp-id=0 (that is, UL BWP #0). Meanwhile, the dedicated BWP for the DL (hereinafter, referred to as a "dedicated DL BWP") may be a DL BWP having bwp-id≠0 (that is, DL BWP #bwp-id), and the dedicated BWP for the UL (hereinafter, referred to as a "dedicated UL BWP") may be a UL BWP having bwp-id #0 (that is, UL BWP #bwp-id). In a case where one or more dedicated DL BWPs and/or one or more dedicated UL BWPs are configured in the terminal 10, one dedicated DL BWP and/or one dedicated UL BWP may be activated.

SSBs are transmitted in one or a plurality of DL BWPs. For example, a cell defining (CD)-SSB may be transmitted in the initial DL BWP, and the CD-SSB and/or a non cell defining (NCD)-SSB may be transmitted in the dedicated DL BWP. The CD-SSB is an SSB associated with a specific cell and may be associated with the SIB1. The NCD-SSB is an SSB not associated with a specific cell and may not be associated with the SIB1.

Figure 4:
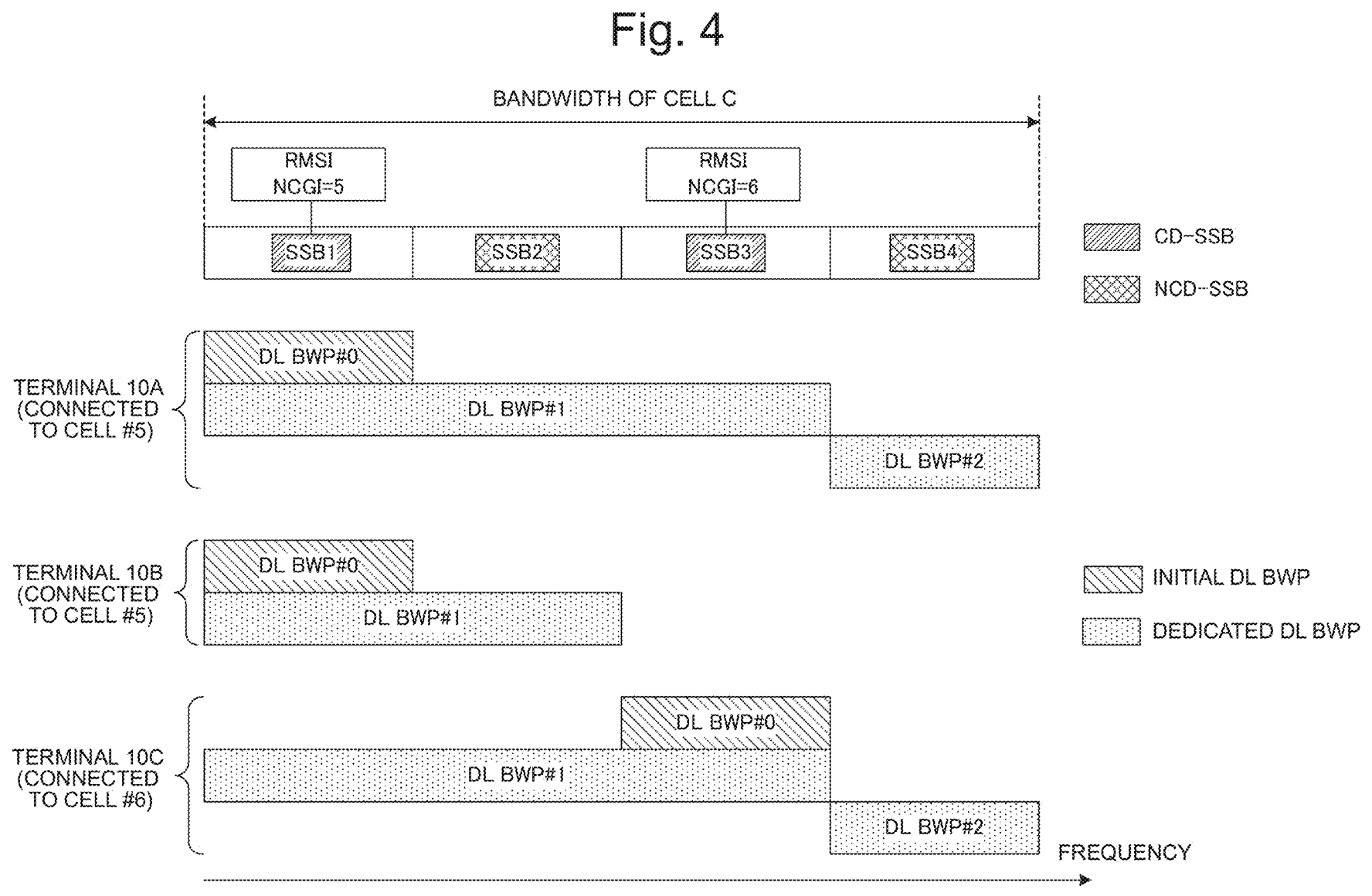

FIG. 4 is a diagram illustrating an example of the DL BWP in the present embodiment. While the DL BWP is illustrated in FIG. 4, the UL BWP may, of course, be configured. For example, in FIG. 4, a plurality of SSBXs (here, X=1 to 4) is transmitted at given frequency locations in the cell C (or in the bandwidth of the cell C). X is a number assigned for convenience in order to distinguish between SSBs of different frequency domains and does not indicate the SSB index for identifying each SSB in the SS burst set.

For example, in FIGS. 4, terminals 10A and 10B are assumed to be connected to cell #5 having an NR cell global identifier (NCGI)=5, and a terminal 10C is assumed to be connected to cell #6 having the NGCI=6. The NGCI is the identifier of the cell C. In addition, the SSB1 is a CD-SSB and is associated with cell #5 (and/or the SIB1 broadcasted by cell #5). In the same manner, the SSB3 is a CD-SSB and is associated with cell #6 (and/or the SIB1 broadcasted by cell #6). Meanwhile, the SSB2 and the SSB4 are NCD-SSBs and are not associated with the SIB1 of a specific cell.

In FIG. 4, since the terminals 10A and 10B are connected to cell #5, the terminals 10A and 10B may detect the SSB1 associated with cell #5 and configure an initial DL BWP #0 based on the SSB1. In addition, the terminal 10A configures dedicated DL BWPs #1 and #2 based on parameters specific to the terminal 10A. The terminal 10A may use the dedicated DL BWPs #1 and #2 by switching the dedicated DL BWPs #1 and #2 in time. Meanwhile, the terminal 10B configures the dedicated DL BWP #1 based on parameters specific to the terminal 10B. In addition, since the terminal 10C is connected to cell #6, the terminal 10C may detect the SSB3 associated with cell #6 and configure the initial DL BWP #0 based on the SSB3. The terminal 10C configures the dedicated DL BWPs #1 and #2 based on parameters specific to the terminal 10C.

Each of the terminals 10A to 10C may perform measurement based on at least one SSB in the initial DL BWP or in the dedicated DL BWP. In the measurement, for example, received power (for example, reference signal received power (RSRP)) may be measured based on the SSB. The RSRP measured based on the SSB may be called synchronization signal (SS)-RSRP. The measurement may be performed for at least one of radio resource management (RRM), radio link monitoring (RLM), or mobility.

RedCap

The terminal 10 may be a RedCap terminal that is assumed to have lower performance and a lower price range than an existing terminal supported in Release 15 or 16 of 3GPP. The RedCap terminal is assumed to be used as, for example, an industrial wireless sensor, a video surveillance camera, and a wearable device. For example, the maximum bandwidth supported by the RedCap terminal may be narrower than the maximum bandwidth of the existing terminal.

In the terminal 10, a plurality of initial BWPs (a plurality of initial DL BWPs and/or a plurality of initial UL BWPs) may be configured. For example, in the terminal 10, the initial DL/UL BWP may be configured independently of the initial DL/UL BWP in the related art. Hereinafter, the initial DL/UL BWP in the related art will be called a first initial DL/UL BWP, and the initial DL/UL BWP configured independently of the first initial DL/UL BWP will be called a second initial DL/UL BWP.

In addition, the initial DL/UL BWP information used for configuring the first initial DL/UL BWP will be called first initial DL/UL BWP information, and the initial DL/UL BWP information used for configuring the second initial DL/UL BWP will be called second initial DL/UL BWP information. Each of the first initial DL/UL BWP information and the second initial DL/UL BWP information may include at least one of locationAndBandwidth, subcarrierSpacing, or cyclicPrefix described above.

The first initial DL/UL BWP may be configured based on CORESET #0 or on the frequency location and/or the bandwidth indicated by locationAndBandwidth in the first initial DL/UL BWP information. The first initial DL/UL BWP may be configured in the existing terminal and/or the RedCap terminal.

Meanwhile, the second initial DL/UL BWP may be a DL/UL BWP having a frequency location and/or a bandwidth set in advance in the specification or may be configured based on the frequency location and/or the bandwidth indicated by locationAndBandwidth in the second initial DL/UL BWP information. The second initial DL/UL BWP may be configured in the RedCap terminal. For the second initial DL/UL BWP, subcarrierSpacing and/or cyclicPrefix described above may be configured or may not be configured. The second initial DL/UL DWP may be called a separate initial DL/UL BWP, an additional initial DL/UL BWP, or the like. The RedCap terminal may use the second initial UL BWP during the initial access (for example, from message 3) and/or after the initial access (for example, after message 4). The RedCap terminal may use the second initial DL BWP after the initial access (for example, after message 4) or may use the second initial DL BWP before the initial access (for example, after reception of configuration information of the second initial DL BWP).

In the second initial DL BWP, CORESET #0 may not be configured. In addition, in the second initial DL BWP, the SIB1 may not be transmitted. In addition, at least a part of the second initial DL BWP may not overlap or may overlap with the first initial UL BWP. In addition, at least a part of the second initial UL BWP may overlap or may not overlap with the first initial UL BWP. The bandwidth of each of the second initial DL BWP and the second initial UL BWP may be narrower than the maximum bandwidth of the RedCap terminal.

FIG. 5 is a diagram illustrating an example of the first and second initial DL/UL BWPs according to the present embodiment. As illustrated in FIG. 5, one ends of the first and second initial UL BWPs may be aligned with each other in order to share a resource region for an uplink control channel (for example, a physical uplink control channel (PUCCH)). In time division duplex (TDD), the second initial UL BWP and the second initial DL BWP may be the same. FIG. 5 is merely an example, and the bandwidths and positions of the first and second initial DL/UL BWPs are not limited to the illustration.

Figure 6A:
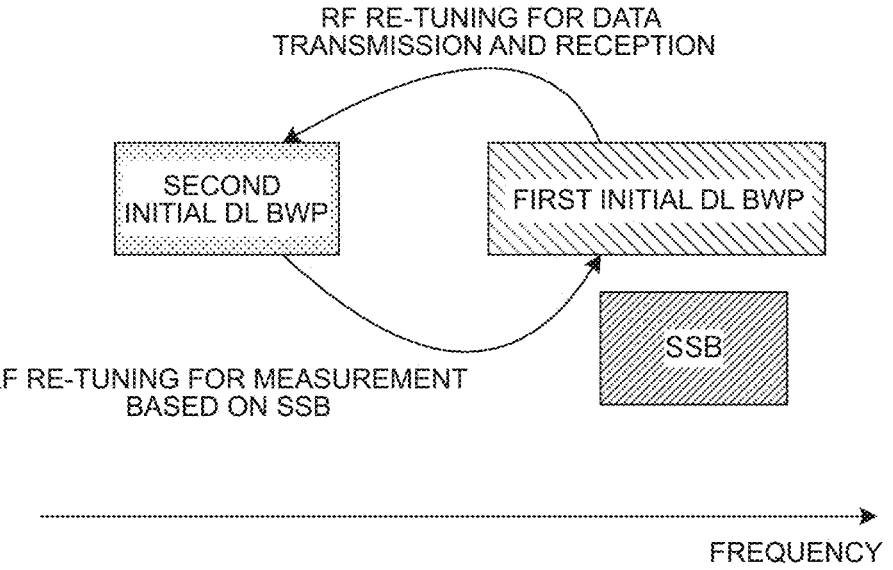
FIGS. 6A and 6B are diagrams illustrating an example of the first and second initial DL BWPs according to the present embodiment.
Figure 6B:
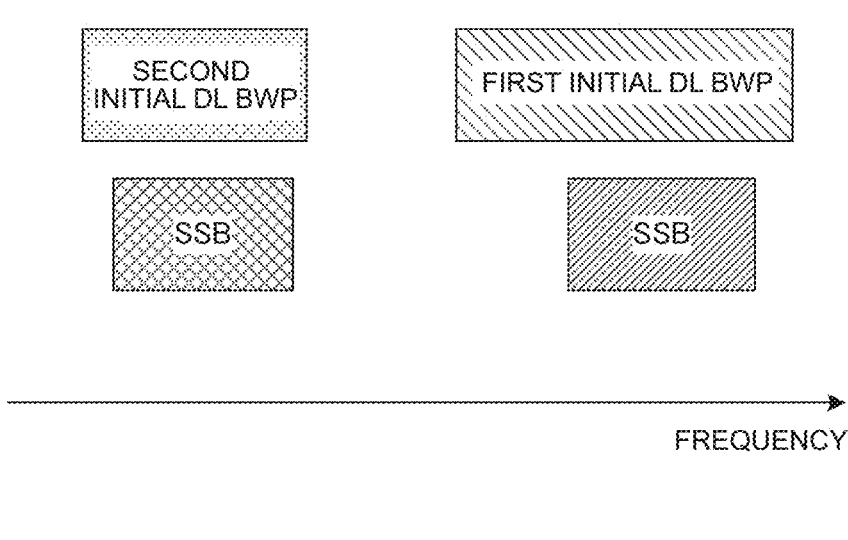

FIGS. 6A and 6B are diagrams illustrating an example of the first and second initial DL BWPs according to the present embodiment. In FIG. 6A, while the SSB (for example, the CD-SSB) is transmitted in the first initial DL BWP, the SSB is not transmitted in the second initial DL BWP. In this case, the terminal 10 that transmits and receives data using the second initial DL BWP performs RF re-tuning for the measurement based on the SSB and is assumed to require the RF re-tuning again for transmitting and receiving data after the measurement. In addition, in FIG. 6A, CORESET #0 may be configured in the first initial DL BWP and not configured in the second initial DL BWP. As illustrated in FIG. 6A, information (hereinafter, referred to as "support information") related to support of the BWP in which the SSB is not transmitted and/or CORESET #0 is not configured may be defined as information (hereinafter, referred to as "UE capability") related to capability of the terminal 10. The UE capability may be transmitted to the base station 20 from the terminal 10.

In FIG. 6B, the SSB (for example, the CD-SSB) is transmitted in the first initial DL BWP, and the SSB (for example, the NC-SSB) is also transmitted in the second initial DL BWP. In FIG. 6B, the RF re-tuning for the measurement is not required unlike in FIG. 6A. Thus, SSB transmission in the second initial DL BWP may contribute to reduction of a processing load of the terminal 10.

However, in a case where the second initial DL BWP is configured in the cell C in which the first initial DL BWP is configured and the SSB may be transmitted in the second initial DL BWP, the terminal 10 may not be able to suitably recognize whether the terminal 10 is to operate based on the SSB of the first initial DL BWP or on the SSB of the second initial DL BWP. Consequently, an operation based on the SSB may not be suitably controlled.

Therefore, the terminal 10 controls the operation based on the SSB depending on whether the second initial DL BWP is configured in the cell C in which the first initial DL BWP is configured. For example, the terminal 10 may determine whether to operate based on the SSB (hereinafter, referred to as a "first SSB") transmitted in the first initial DL BWP or on the SSB (hereinafter, referred to as a "second SSB") transmitted in the second initial DL BWP depending on whether the second initial DL BWP is configured in the cell C. Accordingly, even in a case where the second initial DL BWP is configured in the cell C in which the first initial DL BWP is configured and the SSB may be transmitted in the second initial DL BWP, the operation based on the SSB can be suitably controlled.

Hereinafter, (1) an operation of determining the PDCCH monitoring occasion for paging, (2) an operation of selecting a resource (hereinafter, referred to as a "random access occasion (RO)") used for the RA preamble and/or transmission of the RA preamble, and (3) an operation during MIB reception will be described as an example of the operation based on the SSB. The present embodiment can be appropriately applied to not only (1) to (3) below but also other operations based on the SSB.

Configuration

Configuration of the terminal 10 for the operations (1) to (3) based on the SSB in the present embodiment will be described. The terminal 10 receives parameters or information from the base station 20. In the present embodiment, the term "configured" may mean reception of the parameters and/or the information or may mean control of the operation of the terminal 10 based on the received parameters and/or the received information. Hereinafter, the parameters and/or the information will be illustrated as, but are not limited to, the RRC parameters. The parameters and/or the information may be parameters of a higher layer (for example, a higher layer above a physical layer such as a medium access control (MAC) layer and a non access stratum (NAS) layer) or may be parameters of the physical layer.

Configuration Related to Initial DL BWP

In the present embodiment, the first initial UL BWP may be configured in the terminal 10 based on the first initial DL BWP information from the base station 20. Here, the first initial DL BWP information may include at least one of locationAndBandwidth, subcarrierSpacing, or cyclicPrefix described above. In addition, the first initial DL BWP information may be an RRC parameter (for example, "BWP" as "genericParameters" in "BWP-DownlinkCommon" as "initialDownlinkBWP" in "DownlinkConfigCommonSIB" in "ServingCellConfigCommonSIB") in the SIB1. Alternatively, the first initial DL BWP information may be an RRC parameter (for example, "BWP" as "genericParameters" in "BWP-DownlinkCommon" as "initialDownlinkBWP" in "DownlinkConfigCommon" in "ServingCellConfigCommon") in other RRC messages. The first initial DL BWP information may be cell-specific.

In addition, the second initial DL BWP may be configured in the terminal 10 based on the second initial DL BWP information from the base station 20. Here, the second initial DL BWP information may include at least one of locationAndBandwidth, subcarrierSpacing, or cyclicPrefix described above. The second initial DL BWP information may be an RRC parameter (for example, "BWP" as "genericParametersRedCap" in "BWP-DownlinkCommon" as "initialDownlinkBWP-RedCap" in "DownlinkConfigCommonSIB" in "ServingCellConfigCommonSIB") in the SIB1. Alternatively, the second initial DL BWP information may be an RRC parameter (for example, "BWP" as "genericParametersRedCap" in "BWP-DownlinkCommon" as "initial-DownlinkBWP-RedCap" in "DownlinkConfigCommon" in "ServingCellConfigCommon") in other RRC messages. The second initial DL BWP information may be cell-specific.

Configuration Related to Initial UL BWP

The first initial DL BWP may be configured in the terminal 10 based on the first initial UL BWP information from the base station 20. Here, the first initial DL BWP information may include at least one of locationAndBandwidth, subcarrierSpacing, or cyclicPrefix described above. In addition, the first initial UL BWP information may be an RRC parameter (for example, "BWP" as "genericParameters" in "BWP-UplinkCommon" as "initialUplinkBWP" in "UplinkConfigCommonSIB" in "ServingCellConfigCommonSIB") in the SIB1. Alternatively, the first initial UL BWP information may be an RRC parameter (for example, "BWP" as "genericParameters" in "BWP-UplinkCommon" as "initialUplinkBWP" in "UplinkConfigCommon" in "ServingCellConfigCommon") in other RRC messages. The second initial UL BWP information may be cell-specific.

In addition, the second initial UL BWP may be configured in the terminal 10 based on the second initial UL BWP information from the base station 20. Here, the second initial UL BWP information may include at least one of locationAndBandwidth, subcarrierSpacing, or cyclicPrefix described above. The second initial UL BWP information may be an RRC parameter (for example, "BWP" as "genericParametersRedCap" in "BWP-UplinkCommon" as "initialUplinkBWP-RedCap" in "UplinkConfigCommonSIB" in "ServingCellConfigCommonSIB") in the SIB1. Alternatively, the second initial UL BWP information may be an RRC parameter (for example, "BWP" as "genericParametersRedCap" in "BWP-UplinkCommon" as "initialUplinkBWP-RedCap" in "UplinkConfigCommon" in "ServingCellConfigCommon") in other RRC messages. The second initial UL BWP information may be cell-specific.

Configuration Related to SSB

The first SSB may be configured in the terminal 10 based on information (hereinafter, referred to as "first SSB transmission information") related to transmission of the first SSB. The first SSB transmission information may include at least one of information (hereinafter, referred to as "ssb-PositionsInBurst") related to transmission of the first SSB in the SS burst set, information (hereinafter, referred to as "ssb-periodicityServingCell") related to the SSB periodicity of the first SSB, information (hereinafter, referred to as "ss-PBCH-BlockPower") related to transmission power of the first SSB, information (hereinafter, referred to as "ssb-Frequency") related to a transmission frequency of the first SSB, or information (hereinafter, referred to as "SSB-MTC") related to a measurement timing of the first SSB. The first SSB transmission information may be an RRC parameter (for example, a parameter in "ServingCellConfigCommonSIB") in the SIB1 or may be an RRC parameter (for example, a parameter in "ServingCellConfigCommon") in other RRC messages. The first SSB transmission information may be cell-specific.

The second SSB may be configured in the terminal 10 based on information (hereinafter, referred to as "second SSB transmission information") related to transmission of the second SSB. The second SSB transmission information may include at least one of information (hereinafter, referred to as "additionalSSB-PositionsInBurst") related to transmission of the second SSB in the SS burst set, information (hereinafter, referred to as "additionalSSB-periodicityServingCell") related to the SSB periodicity of the second SSB, information (hereinafter, referred to as "additional-SS- PBCH-BlockPower") related to transmission power of the second SSB, information (hereinafter, referred to as "additionalSSB-Frequency") related to a transmission frequency of the second SSB, or information (hereinafter, referred to as "additionalSSB-SMTC") related to a measurement timing of the second SSB. The second SSB transmission information may be an RRC parameter (for example, a parameter in "ServingCellConfigCommonSIB") in the SIB1 or may be an RRC parameter (for example, a parameter in "ServingCellConfigCommon") in other RRC messages. The second SSB transmission information may be cell-specific. In addition, in a case where additionalSSB-PositionsInBurst and/or additionalSSB-periodicityServingCell and/or additional-SS-PBCH-BlockPower and/or additionalSSB-SMTC is not configured, the first SSB transmission information (ssb-PositionsInBurst and/or ssb-periodicityServingCell and/or ss-PBCH-BlockPower and/or ssb-SMTC) may be applied to the second SSB transmission information.

In a case where a transmission resource of the first SSB overlaps with a transmission resource of the second SSB, the terminal 10 may use the first SSB (that is, prioritize the first SSB). The transmission resource may be, for example, a resource of the time domain and/or the frequency domain.

Configuration Related to PDCCH

Information (hereinafter, referred to as "pdcch-Config-Common") related to configuration of the PDCCH in the first initial DL BWP may be configured in the terminal 10. pdcch-ConfigCommon may include at least one of information (hereinafter, referred to as "pagingSearchSpace") related to the paging search space, information (hereinafter, referred to as "ra-SearchSpace") related to the RA search space, information (hereinafter, referred to as "commonControlResourceSet") related to the CORESET, or information (hereinafter, referred to as "firstPDCCH-MonitoringOccasionOfPO") related to the first PDCCH monitoring occasion in a paging occasion (PO). pdcch-ConfigCommon may be an RRC parameter (for example, a parameter in "BWP-DownlinkCommon" as "initialDownlinkBWP" in "DownlinkConfigCommonSIB" in "ServingCellConfigCommonSIB") in the SIB1. Alternatively, pdcch-ConfigCommon may be an RRC parameter (for example, a parameter in "BWP-DownlinkCommon" as "initialDownlinkBWP" in "DownlinkConfigCommon" in "ServingCellConfigCommon") in other RRC messages. pdcch-ConfigCommon may be cell-specific. pdcch-ConfigCommon may be called first downlink control channel configuration information or the like.

Information (hereinafter, referred to as "pdcch-Config-CommonRedCap") related to configuration of the PDCCH in the second initial DL BWP may be configured in the terminal 10. pdcch-ConfigCommonRedCap may include at least one of pagingSearchSpace, ra-SearchSpace, commonControlResourceSet, or firstPDCCH-MonitoringOccasionOfPO. pdcch-ConfigCommonRedCap may be an RRC parameter (for example, a parameter in "BWP-DownlinkCommon" as "initialDownlinkBWP" in "DownlinkConfigCommonSIB" in "ServingCellConfigCommonSIB") in the SIB1. Alternatively, pdcch-ConfigCommonRedCap may be an RRC parameter (for example, a parameter in "BWP-DownlinkCommon" as "initialDownlinkBWP" in "DownlinkConfigCommon" in "ServingCellConfigCommon") in other RRC messages. pdcch-ConfigCommonRedCap may be cell-specific. pdcch-ConfigCommonRedCap may be called second downlink control channel configuration information or the like.

Configuration Related to Random Access

Information (hereinafter, referred to as "rach-ConfigCommon") related to configuration of the random access in the first initial DL BWP may be configured in the terminal 10. rach-ConfigCommon may include at least one of information (hereinafter, referred to as "ssb-perRACH-OccasionAndCB-PreamblesPerSSB") indicating the number of first SSBs per RO and/or the number of RA preambles per transmission of the first SSB or information (hereinafter, referred to as "rsrp-ThresholdSSB") related to a threshold of the received power (for example, the RSRP) of the first SSB. rach-ConfigCommon may be an RRC parameter (for example, a parameter in "BWP-UplinkCommon" as "initialUplinkBWP" in "UplinkConfigCommonSIB" in "ServingCellConfigCommonSIB") in the SIB1. Alternatively, rach-ConfigCommon may be an RRC parameter (for example, a parameter in "BWP-UplinkCommon" as "initialUplinkBWP" in "UplinkConfigCommon" in "ServingCellConfigCommon") in other RRC messages. rach-ConfigCommon may be cell-specific. rach-ConfigCommon may be called a first random access parameter or the like.

Information (hereinafter, referred to as "rach-ConfigCommonRedCap") related to configuration of the random access in the second initial DL BWP may be configured in the terminal 10. rach-ConfigCommonRedCap may include at least one of information (hereinafter, referred to as "ssb-perRACH-OccasionAndCB-PreamblesPerSSB") indicating the number of second SSBs per RO and/or the number of RA preambles per transmission of the second SSB or information (hereinafter, referred to as "rsrp-ThresholdSSB") related to a threshold of the received power (for example, the RSRP) of the second SSB. rach-ConfigCommonRedCap may be an RRC parameter (for example, a parameter in "BWP-UplinkCommon" as "initialUplinkBWP" in "UplinkConfigCommonSIB" in "ServingCellConfigCommonSIB") in the SIB1. Alternatively, rach-ConfigCommonRedCap may be an RRC parameter (for example, a parameter in "BWP-UplinkCommon" as "initialUplinkBWP" in "UplinkConfigCommon" in "ServingCellConfigCommon") in other RRC messages. rach-ConfigCommonRedCap may be cell-specific. rach-ConfigCommonRedCap may be called a second random access parameter or the like.

Configuration Related to Paging

Information (hereinafter, referred to as "PCCH-Config") related to configuration of the paging in the first initial DL BWP may be configured in the terminal 10. PCCH-Config may include at least one of information (hereinafter, referred to as "PagingCycle") related to a paging cycle, firstPDCCH-MonitoringOccasionOfPO, information (hereinafter, referred to as "nAndPagingFrameOffset") indicating the number of paging frames (PFs) in the paging cycle and/or a time offset, information (hereinafter, referred to as "ns") related to the number of POs per PF, or information (hereinafter, referred to as "nrofPDCCH-MonitoringOccasionPerSSB-InPO") related to the number of PDCCH monitoring occasions per SSB in the PO. PCCH-Config may be an RRC parameter (for example, a parameter in "DownlinkConfigCommonSIB" in "ServingCellConfigCommonSIB") in the SIB1. PCCH-Config may be cell-specific. PCCH-Config may be called first paging configuration information or the like.

Information (hereinafter, referred to as "PCCH-ConfigRedCap") related to configuration of the paging in the second initial DL BWP may be configured in the terminal 10. PCCH-ConfigRedCap may include at least one of defaultPagingCycle, firstPDCCH-MonitoringOccasionOfPO, nAndPagingFrameOffset, ns, or nrofPDCCH-MonitoringOccasionPerSSB-InPO. PCCH-ConfigRedCap may be an RRC parameter (for example, a parameter in "Down-linkConfigCommonSIB" in "ServingCellConfigCommon-SIB") in the SIB1. PCCH-Config may be cell-specific. PCCH-ConfigRedCap may be called second paging configuration information or the like.

Operation Based on SSB (1) Operation of Determining PDCCH Monitoring Occasion for Paging The terminal 10 receives the DCI used for scheduling the PDSCH in which a paging message is transmitted, by monitoring the PDCCH in the PDCCH monitoring occasion. The DCI may be CRC-scrambled using a specific RNTI (for example, a paging (P)-RNTI). The terminal 10 may determine the PDCCH monitoring occasion based on whether the second initial DL BWP is configured in the cell C in which the first initial DL BWP is configured.

The terminal 10 determines the paging frame based on at least one of a DRX periodicity, the number of PFs in the DRX periodicity, the time offset, or an identifier of the terminal 10. Here, the PF is, for example, a radio frame (RF) including the PO. For example, the terminal 10 may determine an identification number (hereinafter, referred to as a "system frame number (SFN)") of the PF based on Formula 1 below.

$$(SFN + \text{PF\_offset}) \bmod\ T = (T\ \text{div}\ N) * (\text{UE\_ID} \bmod N) \quad \text{Formula 1}$$

Here, T is the DRX periodicity, N is the number of PFs in T, PF_offset is a given offset, and UE_ID is a value determined based on the identifier (for example, 5G-S-TMSI) of the terminal 10. T may be determined based on PagingCycle described above. PagingCycle may indicate, for example, 32, 64, 128, or 256 RFs. In addition, N and/or PF_offset may be determined based on nAndPagingFrameOffset described above. nAndPagingFrameOffset may indicate positioning of the PF for every x RFs in T (for example, x=1, 2, 4, 8, or 16) and/or the time offset.

The terminal 10 may determine the PO in the PF based on at least one of an ID of the search space used as the paging search space, firstPDCCH-MonitoringOccasionOfPO described above, or nrofPDCCH-MonitoringOccasion-PerSSB-InPO described above. The PO is, for example, a set of one or more PDCCH monitoring occasions for the paging and may be configured with S*X consecutive PDCCH monitoring occasions (for example, S*X consecutive symbols excluding a UL symbol) from a time location indicated by firstPDCCH-MonitoringOccasionOfPO. Each PDCCH monitoring occasion in the PO may be configured with a given number of symbols. firstPDCCH-MonitoringOccasionOfPO may indicate, for example, the time location (for example, the location of the symbol) of the first PDCCH monitoring occasion in the PF.

Here, S described above is the number of SSBs actually transmitted in the SS burst set and may be indicated by ssb-PositionsInBurst or additionalSSB-PositionsInBurst described above. X is the number of PDCCH monitoring occasions per SSB in the PO and may be determined based on nrofPDCCH-MonitoringOccasionPerSSB-InPO. nrofPDCCH-MonitoringOccasionPerSSB-InPO indicates that, for example, the number of PDCCH monitoring occasions per SSB in the PO is any of two to four and, in a case where nrofPDCCH-MonitoringOccasionPerSSB-InPO is not configured, may indicate that the number of PDCCH monitoring occasions is one.

FIGS. 7 and 8 are diagrams illustrating an example of the SSB, the PF, and the PO according to the present embodiment. While examples of the first and second SSBs, the PF, and the PO in the first and second initial DL BWPs are illustrated in FIGS. 7 and 8, respectively, configuration of the first and second SSBs, the PF, and the PO in the first and second initial DL BWPs is not limited to the illustration and is appropriately changed by configuring various parameters.

For example, in the first initial DL BWP, as illustrated in FIG. 7, T=32 RFs is set, and nAndPagingFrameOffset may indicate that the PF is positioned for each RF in T (oneT). The terminal 10 may determine the PF (here, RF #0) for the terminal 10 among 32 PFs in T based on UE_ID. In addition, firstPDCCH-MonitoringOccasionOfPO for the first initial DL BWP indicates the fifth symbol (that is, symbol #4 of slot #0) from the first among symbols #0 to #139 in the PF. In addition, since ssb-PositionsInBurst=11111111 is set and SSBs #0 to #7 (first SSB) in the SS burst set are actually transmitted, S=8 is set. In addition, since the number of PDCCH occasions per first SSB is one, X=1 is set. Accordingly, the terminal 10 determines eight consecutive symbols from symbol #4 of slot #0 of RF #0 as the PO. The PO may be configured with S*X (here, eight) PDCCH monitoring occasions, and SSBs #0 to #7 may correspond to the first to eighth PDCCH monitoring occasions (that is, the PDCCH monitoring occasions of symbols #4 to #11 of slot #0), respectively, in the PO. In the case of the multi-beam operation, the terminal 10 may assume that the corresponding SSB and the DM-RS of the PDCCH are quasi-collocated in each PDCCH monitoring occasion in the PO.

Meanwhile, in the second initial DL BWP, as illustrated in FIG. 8, T=32 RFs is set, and nAndPagingFrameOffset may indicate that the PF is positioned for every 8 RFs in T (oneEightT) and the time offset is "2". The terminal 10 may determine the PF (here, RF #2) for the terminal 10 among 4 PFs in T based on UE_ID. In FIG. 8, since nAndPaging-FrameOffset indicates oneEightT, candidate locations of the first symbol of a paging monitoring occasion are 1120 symbols (that is, 1120 symbols (=8*10*14) of indexes #0 to #1119 of RFs #0 to #7). In FIG. 8, firstPDCCH-MonitoringOccasionOfPO for the second initial DL BWP indicates symbol #284 (that is, symbol #4 of slot #0 of PF #2) among symbols #0 to #1119 in RFs #0 to #7. While a symbol index is assigned for each slot in each RF in FIG. 8, symbol indexes #0 to #1119 may be assigned to all symbols in RFs #0 to #7. In addition, since additionalSSB-PositionsIn-Burst=11110000 is set, SSBs #0 to #3 (second SSB) in the SS burst set are actually transmitted, and SSBs #4 to #7 are not actually transmitted, S=4 is set. In addition, since the number of PDCCH occasions per SSB is one, X=1 is set. Accordingly, the terminal 10 determines four consecutive symbols from symbol #4 of slot #0 of RF #2 as the PO. The PO may be configured with S*X (here, four) PDCCH monitoring occasions, and SSBs #0 to #4 may correspond to the first to fourth PDCCH monitoring occasions (that is, the PDCCH monitoring occasions of symbols #4 to #7 of slot #0), respectively, in the PO. The terminal 10 may assume that the corresponding SSB and the DM-RS of the PDCCH are quasi-collocated in each PDCCH monitoring occasion in the PO.

As illustrated in FIGS. 7 and 8, parameters (for example, the first SSB transmission information and pdcch-Config-Common) for the first initial DL BWP and parameters (for example, the second SSB transmission information and pdcch-ConfigCommonRedCap) for the second initial DL BWP may be configured in the terminal 10 independently of each other. Therefore, the terminal 10 determines whether to configure the PDCCH monitoring occasion for paging based on the parameters for the first initial DL BWP or on the parameters for the second initial DL BWP, depending on whether the second initial DL BWP is configured and/or whether a given condition is satisfied.

Figure 9:
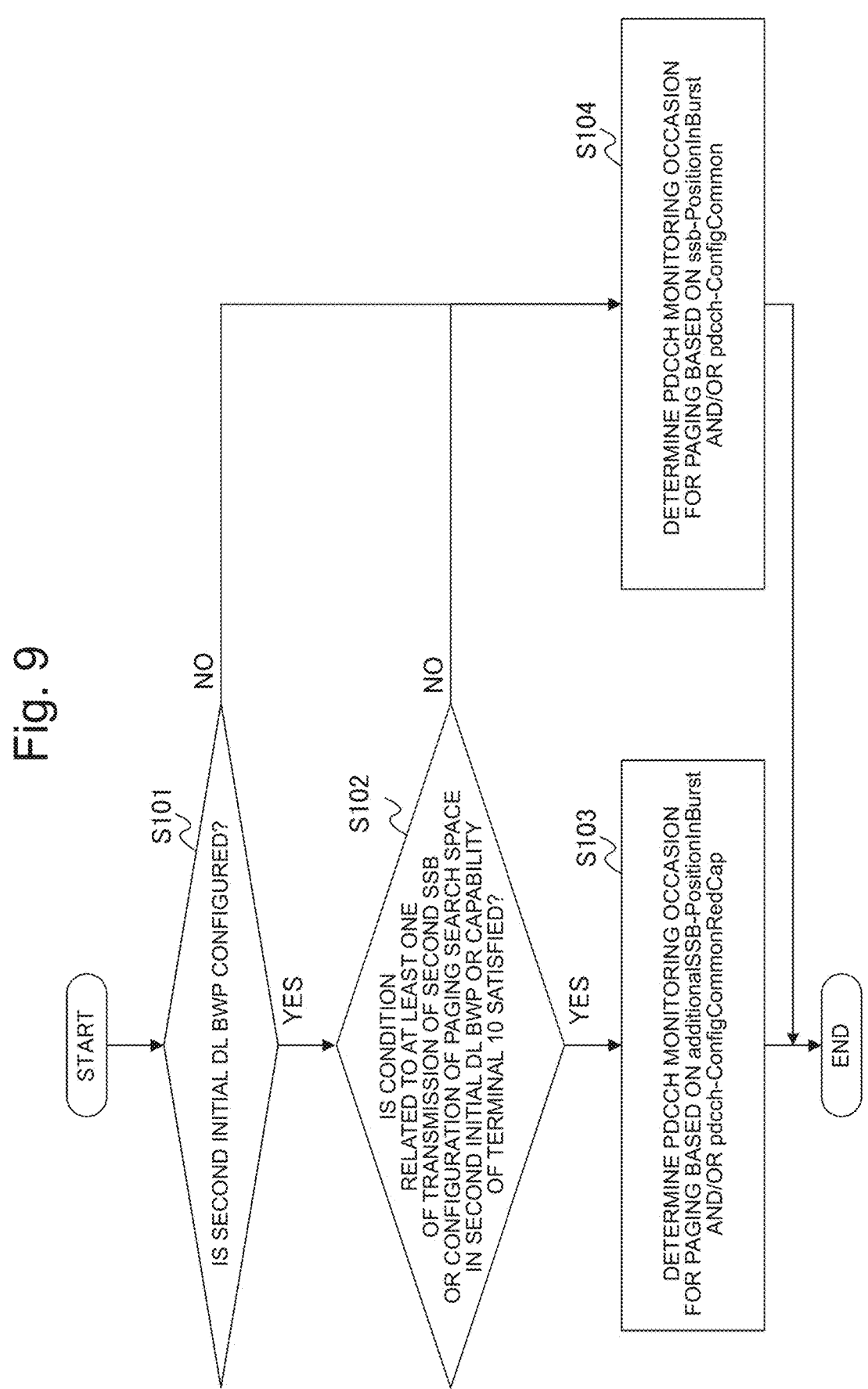
FIG. 9 is a flowchart illustrating an example of an operation of configuring a PDCCH monitoring occasion for paging according to the present embodiment.

FIG. 9 is a flowchart illustrating an example of the operation of determining the PDCCH monitoring occasion for paging according to the present embodiment. In FIG. 9, the first initial DL BWP is assumed to be configured in the terminal 10. In step S101, the terminal 10 determines whether the second initial DL BWP is configured.

In step S102, in a case where the second initial DL BWP is configured in the terminal 10, the terminal 10 determines whether a condition related to at least one of transmission of the second SSB in the second initial DL BWP, configuration of the paging search space in the second initial DL BWP, or the capability of the terminal 10 is satisfied. Specifically, the terminal 10 may determine whether at least one of the following conditions is satisfied.

(a) Transmission of the second SSB in the second initial DL BWP is configured.

(b) The paging search space is configured in the second initial DL BWP.

(c) The terminal 10 has a specific capability.

For example, the condition (a) may be such that the second SSB transmission information (for example, at least one of additionalSSB-Frequency, additionalSSB-PositionsInBurst, or additionalSSB-PeriodicityServingCell) is configured. In addition, the condition (b) may be such that pagingsearchspace (for example, a search space ID of the paging search space) is configured in pdcch-ConfigCommonRedCap or pagingsearchspace and commonControlResourceSet are configured in pdcch-ConfigCommonRedCap. In addition, the specific capability in the condition (c) is the capability of the terminal 10 related to CORESET #0 and/or the SSB in the BWP. For example, the condition (c) may be such that each BWP configured in the terminal 10 includes the bandwidths of CORESET #0 and the SSB (feature group 6-1) and/or a BWP not including the bandwidths of CORESET #0 and the SSB is allowed (feature group 6-1a).

In a case where the second initial DL BWP is configured and the condition in step S102 is satisfied (step S102; YES), the terminal 10, in step S103, determines the PDCCH monitoring occasion for paging based on additionalSSB-PositionsInBurst related to the second SSB and/or pdcch-ConfigCommonRedCap related to configuration of the PDCCH in the second initial DL BWP.

Specifically, in step S103, in a case where the search space ID indicated by pagingsearchspace in pdcch-ConfigCommonRedCap is other than 0, the terminal 10 may determine the PDCCH monitoring occasion for paging based on additionalSSB-PositionsInBurst and/or pdcch-ConfigCommonRedCap. For example, as illustrated in FIG. 8, the terminal 10 may determine the PDCCH monitoring occasion for paging as symbols #4 to #7 in slot #0 in RF #2 based on additionalSSB-PositionsInBurst and on firstPDCCH-MonitoringOccasionOfPO in pdcch-ConfigCommonRedCap. Meanwhile, in a case where the search space ID is 0, the terminal 10 may determine the PDCCH monitoring occasion for the SIB1 as the PDCCH monitoring occasion for paging.

In step S103, the terminal 10 may determine the PDCCH monitoring occasion for paging based on pcch-ConfigRedCap instead of pdcch-ConfigCommonRedCap or in addition to pdcch-ConfigCommonRedCap. For example, the terminal 10 may determine the PDCCH monitoring occasion for paging based on at least one of firstPDCCH-MonitoringOccasionOfPO in pdcch-ConfigCommonRedCap or in pcch- ConfigRedCap, nrofPDCCH-MonitoringOccasionPerSSB-InPO in pcch-ConfigRedCap, defaultPagingCycle in pcch-ConfigRedCap, or nAndPagingFrameOffset in pcch-ConfigRedCap.

In a case where the second initial DL BWP is not configured (step S101; NO) or in a case where the second initial DL BWP is configured and the condition in step S102 is not satisfied (step S102; NO), the terminal 10, in step S104, determines the PDCCH monitoring occasion for paging based on ssb-PositionsInBurst related to the first SSB and/or pdcch-ConfigCommon related to configuration of the PDCCH in the first initial DL BWP.

Specifically, in step S104, in a case where the search space ID indicated by pagingsearchspace in pdcch-ConfigCommon is other than 0, the terminal 10 may determine the PDCCH monitoring occasion for paging based on ssb-PositionsInBurst and/or pdcch-ConfigCommon. For example, as illustrated in FIG. 7, the terminal 10 may determine the PDCCH monitoring occasion for paging as symbols #4 to #11 in slot #0 in RF #0 based on ssb-PositionsInBurst and on firstPDCCH-MonitoringOccasionOfPO in pdcch-ConfigCommon. Meanwhile, in a case where the search space ID is 0, the terminal 10 may determine the PDCCH monitoring occasion for the SIB1 as the PDCCH monitoring occasion for paging.

In step S104, the terminal 10 may determine the PDCCH monitoring occasion for paging based on pcch-Config instead of pdcch-ConfigCommon or in addition to pdcch-ConfigCommon. For example, the terminal 10 may determine the PDCCH monitoring occasion for paging based on at least one of firstPDCCH-MonitoringOccasionOfPO in pdcch-ConfigCommonRedCap or in pcch-Config, nrofPDCCH-MonitoringOccasionPerSSB-InPO in pcch-Config, defaultPagingCycle in pcch-Config, or nAndPagingFrameOffset in pcch-Config.

According to the above operation, even in a case where the second SSB may be transmitted in the second initial DL BWP, the PDCCH monitoring occasion for paging can be suitably determined. Accordingly, the terminal 10 can receive the paging message based on the DCI detected in the PDCCH monitoring occasion.

(2) Operation of Determining RA Preamble and/or RO

In the random access procedure, the terminal 10 transmits the RA preamble. The terminal 10 may determine the RA preamble and/or the RO used for transmitting the RA preamble based on whether the second initial DL BWP is configured in the cell C in which the first initial DL BWP is configured.

The RA preamble is a given sequence and is called a PRACH preamble, a preamble, a preamble sequence, message 1, a PRACH, or the like. The RO is, for example, a resource of the time domain and/or the frequency domain for transmitting the RA preamble and may be configured with one or more symbols and M (M 1) resource blocks. The RO is called a PRACH occasion, a random access occasion, a transmission occasion, an occasion, or the like. The RA preamble may be transmitted using a random access channel (PRACH). The RACH is a UL channel used for transmitting the RA preamble and is called a physical random access channel (PRACH) or the like.

The random access procedure includes contention based random access (CBRA) and contention free random access (CFRA). Two types are supported for each of the CBRA and the CFRA. A first type is called type 1, a type-1 random access procedure, a 4 step RACH, 4 step random access, or the like. A second type is called type 2, a type-2 random access procedure, a 2 step RACH, 2 step random access, or the like.

In the CBRA of type 1, the terminal 10 randomly selects the RA preamble and transmits the selected RA preamble to the base station 20. The terminal 10 receives a random access response (RAR) (called message 2) through the PDSCH in accordance with the RA preamble and transmits message 3 through the PUSCH in accordance with the RAR. The terminal 10 receives message 4 (contention resolution message) through the PDSCH in accordance with message 3.

In the CFRA of type 1, the terminal 10 transmits the RA preamble allocated by the base station 20 to the base station 20. The terminal 10 receives the RAR from the base station 20 through the PDSCH in accordance with the RA preamble. Since the RA preamble is indicated by the DCI, the CFRA is also called RA of PDCCH order.

In the CBRA of type 2, the terminal 10 transmits the RA preamble and message 3 in the CBRA of type 1 as message A and receives message B (that is, the RAR). Even in the CBRA of type 2, the RA preamble in message A is randomly selected. In the CFRA of type 2, the RA preamble indicated by the DCI from the base station 20 and message 3 are transmitted as message A, and message B is received.

In the CBRA and the CFRA of types 1 and 2 described above, the terminal 10 may select the RO and/or the RA preamble based on the RSRP of the SSB and transmit the RA preamble using the selected RO. The base station 20 can recognize which SSB the terminal 10 has received, that is, which beamforming direction the terminal 10 is in, from the RA preamble received from the terminal 10 and/or the RO used for transmitting the RA preamble. That is, the base station 20 may estimate a quasi-collocation (QCL) relationship for the terminal 10 based on the RA preamble from the terminal 10 and/or the SSB associated with the RO used for receiving the RA preamble. A control unit 203 may control transmission of a DL signal and/or reception of a UL signal using the same spatial parameter (beam) as the SSB.

In addition, the terminal 10 may detect the DCI which is CRC-scrambled using a specific RNTI (for example, an RA-RNTI) by monitoring the PDCCH in the RA search space and receive at least one of the RAR, message 4, or message B in the CBRA and the CFRA of types 1 and 2 through the PDSCH scheduled using the DCI.

Figure 10:
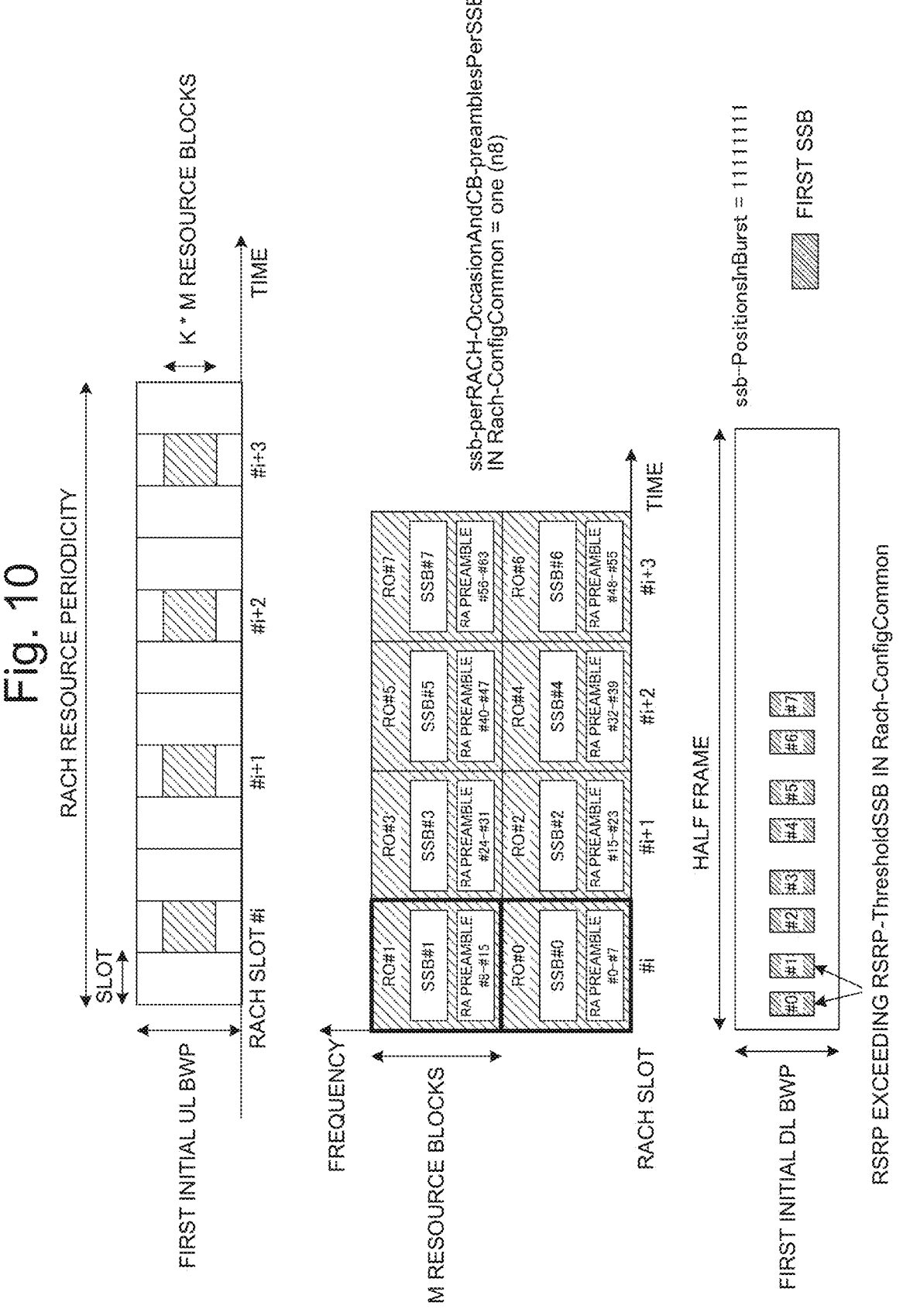
FIG. 10 is a diagram illustrating an example of a relationship between the SSB and an RO and an RA preamble according to the present embodiment.

FIG. 10 is a diagram illustrating an example of a relationship between the SSB and the RO and the RA preamble according to the present embodiment. For example, in FIG. 10, a relationship between SSBs #0 to #7 (first SSB) actually transmitted in the first initial DL BWP and the RO and the RA preamble in the first initial UL BWP is illustrated. FIG. 10 is merely an example, and the relationship between the SSB and the RO and the RA preamble is not limited to the illustration.

As illustrated in FIG. 10, one or a plurality of slots (hereinafter, referred to as "RACH slots") used for transmitting the RA preamble is provided with a given periodicity (hereinafter referred to as a "RACH resource periodicity"). For example, in FIG. 10, the RACH resource periodicity is, but not limited to, 10 slots, and the RACH slots are, but not limited to, the second, fifth, and eighth slots in the RF.

For example, as illustrated in FIG. 10, one or more ROs may be provided in each RACH slot. One RO is configured with M (M≥1) resource blocks. In addition, K (in FIG. 10, K=2) ROs can be positioned in the frequency domain. In addition, one or more ROs per RACH slot can be positioned in the time domain. For example, in FIG. 10, total two ROs of two in the frequency domain and one in the time domain are positioned per RACH slot. In this manner, one or more ROs may be included in the time domain and/or the frequency domain in each RACH slot.

The SSB is associated with one or more ROs. In addition, one SSB is associated with one or more RA preambles. Association between the SSB and the RO and/or the RA preamble may be indicated by ssb-perRACHOccasionAndCB-PreamblesPerSSB described above. Specifically, ssb-perRACHOccasionAndCB-PreamblesPerSSB described above may indicate the number of SSBs associated with one RO and/or the number of RA preambles associated with one SSB.

For example, in FIG. 10, ssb-PositionsInBurst=11111111 is assumed, and SSBs #0 to #7 in the SS burst set are assumed to be actually transmitted in the first initial DL BWP. ssb-perRACHOccasionAndCB-PreamblesPerSSB indicates that one SSB corresponds to one RO ("one") and eight RA preambles correspond to one SSB ("n8"). The number X of SSBs associated with one RO is not limited to one and may be a number greater than one (for example, 2, 4, 8, or 16) or a number smaller than one (for example, $\frac{1}{8}$, $\frac{1}{4}$, or $\frac{1}{2}$). In a case where X 1 is set, X SSBs are associated with one RO. In a case where X<1 is set, one SSB is associated with the number of ROs corresponding to a reciprocal of X. In addition, a number Y of RA preambles associated with one SSB is, for example, but not limited to, 4, 8, or 12 and may be greater than or equal to one. In addition, indexes and the like of the RO and the RA preamble associated with each SSB illustrated in FIG. 10 are merely an example and are not limited to the illustration.

In FIG. 10, the terminal 10 measures the RSRP using SSBs #0 to #7 in the SS burst set in the first initial DL BWP. In the terminal 10, at least one of SSBs #0 to #7 is selected based on measurement results of the RSRPs of SSBs #0 to #7 and on the threshold indicated by rsrp-ThresholdSSB. Specifically, the terminal 10 may select at least one of SSBs #0 to #7 of which the RSRP exceeds the threshold.

For example, in FIG. 10, in the case of selecting two SSBs #0 and #1 based on the RSRP and on the threshold, the terminal 10 randomly selects one RA preamble from RA preambles #0 to #15 associated with SSBs #0 and #1. In addition, the terminal 10 selects one RO from ROs #0 and #1 associated with SSBs #0 and #1, respectively. The terminal 10 transmits the selected RA preamble using the selected RO. In the case of the CFRA, the terminal 10 may transmit the RA preamble indicated by the DCI using the selected RO.

In addition, while the CBRA or the CFRA of type 1 is assumed in FIG. 10, the same can be applied to the CBRA or the CFRA of type 2. Information (hereinafter, referred to as "msgA-SSB-PerRACH-OccasionAndCB-PreamblesPerSSB") related to association of the RO and/or the RA preamble for message A may be configured in the terminal 10. In addition, information (hereinafter, referred to as "msgA-RSRP-ThresholdSSB") related to a threshold of the RSRP of the SSB may be configured in the terminal 10 for the CBRA or the CFRA of type 2. The terminal 10 may select the RA preamble as message A and/or the RO for transmitting the RA preamble based on msgA-SSB-Per-RACH-OccasionAndCB-PreamblesPerSSB and on msgA-RSRP-ThresholdSSB, in the same manner as ssb-perRA-CHOccasionAndCB-PreamblesPerSSB and RSRP-ThresholdSSB described in FIG. 10.

Figure 11:
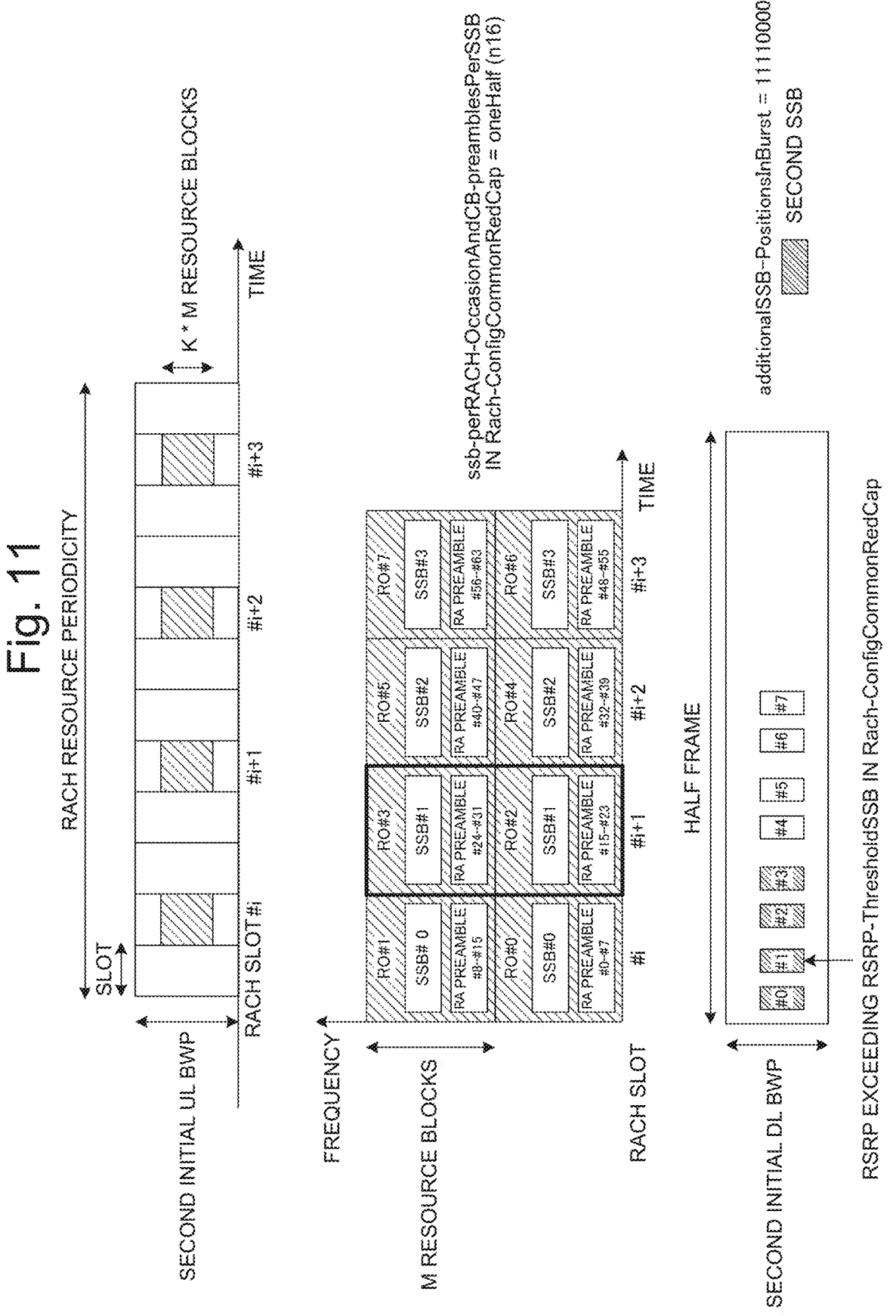
FIG. 11 is a diagram illustrating another example of the relationship between the SSB and the RO and the RA preamble according to the present embodiment.

FIG. 11 is a diagram illustrating another example of the relationship between the SSB and the RO and the RA preamble according to the present embodiment. For example, in FIG. 11, a relationship between SSBs #0 to #3 (second SSB) actually transmitted in the second initial DL BWP and the RO and the RA preamble in the second initial UL BWP is illustrated. FIG. 11 is merely an example, and the relationship between the SSB and the RO and the RA preamble is not limited to the illustration. In addition, in FIG. 11, differences from FIG. 10 are mainly described.

For example, in FIG. 11, additionalSSB-PositionsIn-Burst=11110000 is assumed, and SSBs #0 to #3 in the SS burst set are assumed to be actually transmitted in the second initial DL BWP. ssb-perRACHOccasionAndCB-Preambles-PerSSB indicates that ½ SSBs correspond to one RO (that is, one SSB corresponds to two ROs) ("oneHalf") and 16 RA preambles correspond to one SSB ("n16").

In FIG. 11, the terminal 10 measures the RSRP using SSBs #0 to #3 in the SS burst set in the second initial DL BWP. In the terminal 10, at least one of SSBs #0 to #7 is selected based on measurement results of the RSRPs of SSBs #0 to #3 and on the threshold indicated by rsrp-ThresholdSSB. Specifically, the terminal 10 may select at least one of SSBs #0 to #3 of which the RSRP exceeds the threshold.

For example, in FIG. 11, in the case of selecting SSB #1 based on the RSRP and on the threshold, the terminal 10 randomly selects one RA preamble from RA preambles #15 to #31 associated with the SSB #1. In addition, the terminal 10 selects one RO from ROs #2 and #3 associated with SSB #1. The terminal 10 transmits the selected RA preamble using the selected RO. In the case of the CFRA, the terminal 10 may transmit the RA preamble indicated by the DCI using the selected RO.

In addition, while the CBRA or the CFRA of type 1 is assumed in FIG. 11, the same can be applied to the CBRA or the CFRA of type 2. Information (hereinafter, referred to as "msgA-SSB-PerRACH-OccasionAndCB-Preambles-PerSSB") related to association of the RO and/or the RA preamble for message A may be configured in the terminal 10. In addition, information (hereinafter, referred to as "msgA-RSRP-ThresholdSSB") related to a threshold of the RSRP of the SSB may be configured in the terminal 10 for the CBRA or the CFRA of type 2. The terminal 10 may select the RA preamble as message A and/or the RO for transmitting the RA preamble based on msgA-SSB-Per-RACH-OccasionAndCB-PreamblesPerSSB and on msgA-RSRP-ThresholdSSB, in the same manner as ssb-perRA-CHOccasionAndCB-PreamblesPerSSB and RSRP-ThresholdSSB described in FIG. 11.

As illustrated in FIGS. 10 and 11, parameters (for example, the first SSB transmission information and rach-ConfigCommon) for the first initial DL BWP and parameters (for example, the second SSB transmission information and rach-ConfigCommonRedCap) for the second initial DL BWP may be configured in the terminal 10 independently of each other. Therefore, the terminal 10 determines whether to select the RO and/or the RA preamble based on the parameters for the first initial DL BWP or on the parameters for the second initial DL BWP, depending on whether the second initial DL BWP is configured and/or whether a given condition is satisfied.

Figure 12:
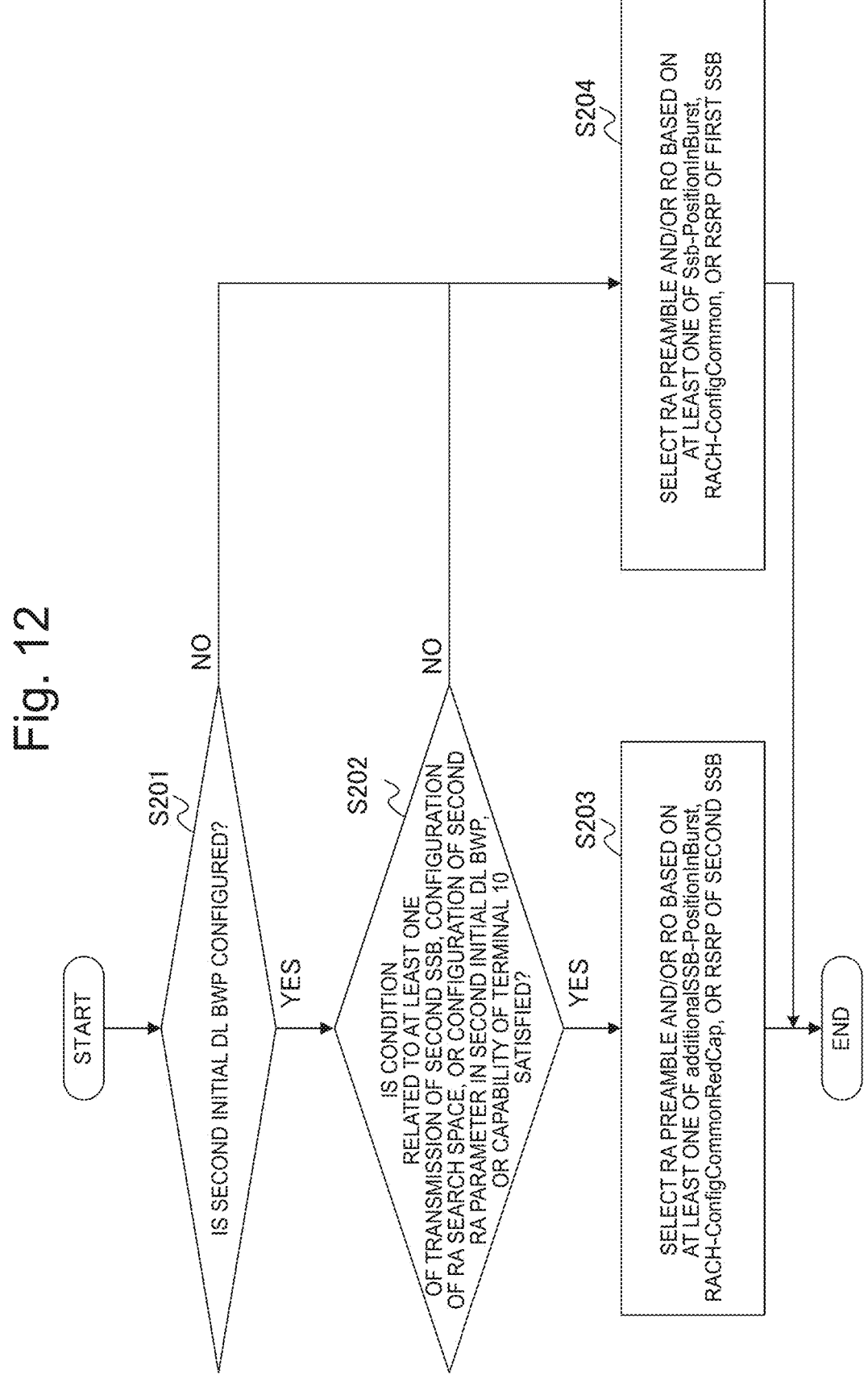
FIG. 12 is a flowchart illustrating an example of an operation of selecting the RO and/or the RA preamble according to the present embodiment.

FIG. 12 is a flowchart illustrating an example of the operation of selecting the RO and/or the RA preamble according to the present embodiment. In FIG. 12, the first initial DL BWP is assumed to be configured in the terminal 10. In step S201, the terminal 10 determines whether the second initial DL BWP is configured.

In step S202, in a case where the second initial DL BWP is configured in the terminal 10, the terminal 10 determines whether a condition related to at least one of transmission of the second SSB in the second initial DL BWP, configuration of the RA search space in the second initial DL BWP, configuration of the second random access parameter, or the capability of the terminal 10 is satisfied. Specifically, the terminal 10 may determine whether at least one of the following conditions is satisfied.

(A) Transmission of the second SSB in the second initial DL BWP is configured.

(B) The RA search space is configured in the second initial DL BWP.

(C) The second random access parameter is configured.

(D) The terminal 10 has a specific capability.

For example, the condition (B) may be such that ra-searchspace (for example, a search space ID of the RA search space) is configured in pdcch-ConfigCommonRed-Cap or ra-searchspace and commonControlResourceSet described above are configured in pdcch-ConfigCommon-RedCap. In addition, the condition (C) may be such that ssb-perRACH-OccasionAndCB-preamblesPerSSB and/or RSRP-ThresholdSSB is configured in rach-ConfigCom-monRedCap. The conditions (A) and (D) are the same as the conditions (a) and (c).

In a case where the second initial DL BWP is configured and the condition in step S202 is satisfied (step S202; YES), the terminal 10, in step S203, selects the RA preamble and/or the RO based on additionalSSB-PositionsInBurst and/or RACH-ConfigCommonRedCap related to the second SSB.

Specifically, in step S203, the terminal 10 may select the RA preamble and/or the RO based on at least one of additionalSSB-PositionsInBurst, ssb-perRACHOccasio-nAndCB-PreamblesPerSSB and RSRP-ThresholdSSB in RACH-ConfigCommonRedCap, or the RSRP of the second SSB. For example, as illustrated in FIG. 11, the terminal 10 may determine the RO and/or the RA preamble correspond-ing to each of SSBs #0 to #3 based on additionalSSB-PositionsInBurst and on ssb-perRACHOccasionAndCB-PreamblesPerSSB in RACH-ConfigCommonRedCap. In addition, the terminal 10 may select at least one of SSBs #0 to #3 (for example, in FIG. 11, SSB #1 of which the RSRP exceeds the threshold indicated by RSRP-ThresholdSSB) based on the RSRPs of SSBs #0 to #3 and on RSRP-ThresholdSSB in RACH-ConfigCommonRedCap. In addi-tion, in FIG. 11, the terminal 10 may select one of ROs #2 and #3 corresponding to the selected SSB and/or one of RA preambles #15 to #31 corresponding to selected SSB #1.

In a case where the second initial DL BWP is not configured (step S201; NO) or in a case where the second initial DL BWP is configured and the condition in step S202 is not satisfied (step S202; NO), the terminal 10, in step S204, selects the RA preamble and/or the RO based on ssb-PositionsInBurst related to the first SSB and/or RACH-ConfigCommon related to the first SSB.

Specifically, in step S204, the terminal 10 may determine the RA preamble and/or the RO based on at least one of ssb-PositionsInBurst, ssb-perRACHOccasionAndCB-Pre-amblesPerSSB and RSRP-ThresholdSSB in RACH-Config-Common, or the RSRP of the first SSB. For example, as illustrated in FIG. 10, the terminal 10 may determine the RO and/or the RA preamble corresponding to each of SSBs #0 to #7 based on ssb-PositionsInBurst and on ssb-perRA-CHOccasionAndCB-PreamblesPerSSB in RACH-Config-Common. In addition, the terminal 10 may select at least one of SSBs #0 to #7 (for example, in FIG. 10, SSBs #0 and #1 of which the RSRP exceeds the threshold indicated by RSRP-ThresholdSSB) based on the RSRPs of SSBs #0 to #7 and on RSRP-ThresholdSSB in RACH-ConfigCommon. In addition, in FIG. 10, the terminal 10 may select one of ROs #0 and #1 corresponding to selected SSBs #0 and #1 and/or one of RA preambles #0 to #15 corresponding to selected SSBs #0 and #1.

The operation illustrated in FIG. 12 can be applied to the CBRA and the CFRA of type 2. In the case of type 2, RACH-ConfigCommon and RACH-ConfigCommonRed-Cap described above may be replaced with msgA-Config-Common and msgA-ConfigCommonRedCap, respectively. In addition, ssb-perRACHOccasionAndCB-Preambles-PerSSB and RSRP-ThresholdSSB may be replaced with msgA-SSB-PerRACH-OccasionAndCB-PreamblesPerSSB and msgA-RSRP-ThresholdSSB, respectively.

According to the above operation, even in a case where the second SSB may be transmitted in the second initial DL BWP, the RO and/or the RA preamble can be suitably selected. Accordingly, an operation related to the random access can be suitably controlled. Selection of the RA preamble described above may mean selection (or determination) of one RA preamble transmitted by the terminal 10 using the RACH from a group (or a set) of one or a plurality of RA preambles. In addition, selection of the RA preamble may be replaced with selection or determination of the index of the RA preamble, and the terminal 10 may transmit the RA preamble of the selected index through the RACH.

(3) Operation during MIB Reception

The terminal 10 receives the MIB through the PBCH. The terminal 10 may control the operation during the MIB reception based on whether the second initial DL BWP is configured in the cell C in which the first initial DL BWP is configured. Specifically, in a case where the second initial DL BWP is configured in the terminal 10, the terminal 10 may ignore a specific parameter in the MIB received through the PBCH in the SSB transmitted in the second initial DL BWP or assume that the specific parameter is not transmitted.

FIG. 13 is a diagram illustrating an example of the MIB according to the present embodiment. As illustrated in FIG. 13, the MIB may include at least one of the following parameters.

Information (hereinafter, referred to as "systemFra-meNumber") related to the SFN Information (hereinafter, referred to as "subCarrierSpacingCommon") related to the subcarrier spacing Information (hereinafter, referred to as "ssb-Subcarrier-Offset") related to a frequency offset ($k_{SSB}$) between the SSB and a resource block grid Information (hereinafter, referred to as "dmrs-TypeA-Position") related to a location of the DM-RS Information (hereinafter, referred to as "pdcch-ConfigSIB1" related to a common CORESET (CORESET #0) and/or the common search space (search space #0)

Figure 14:
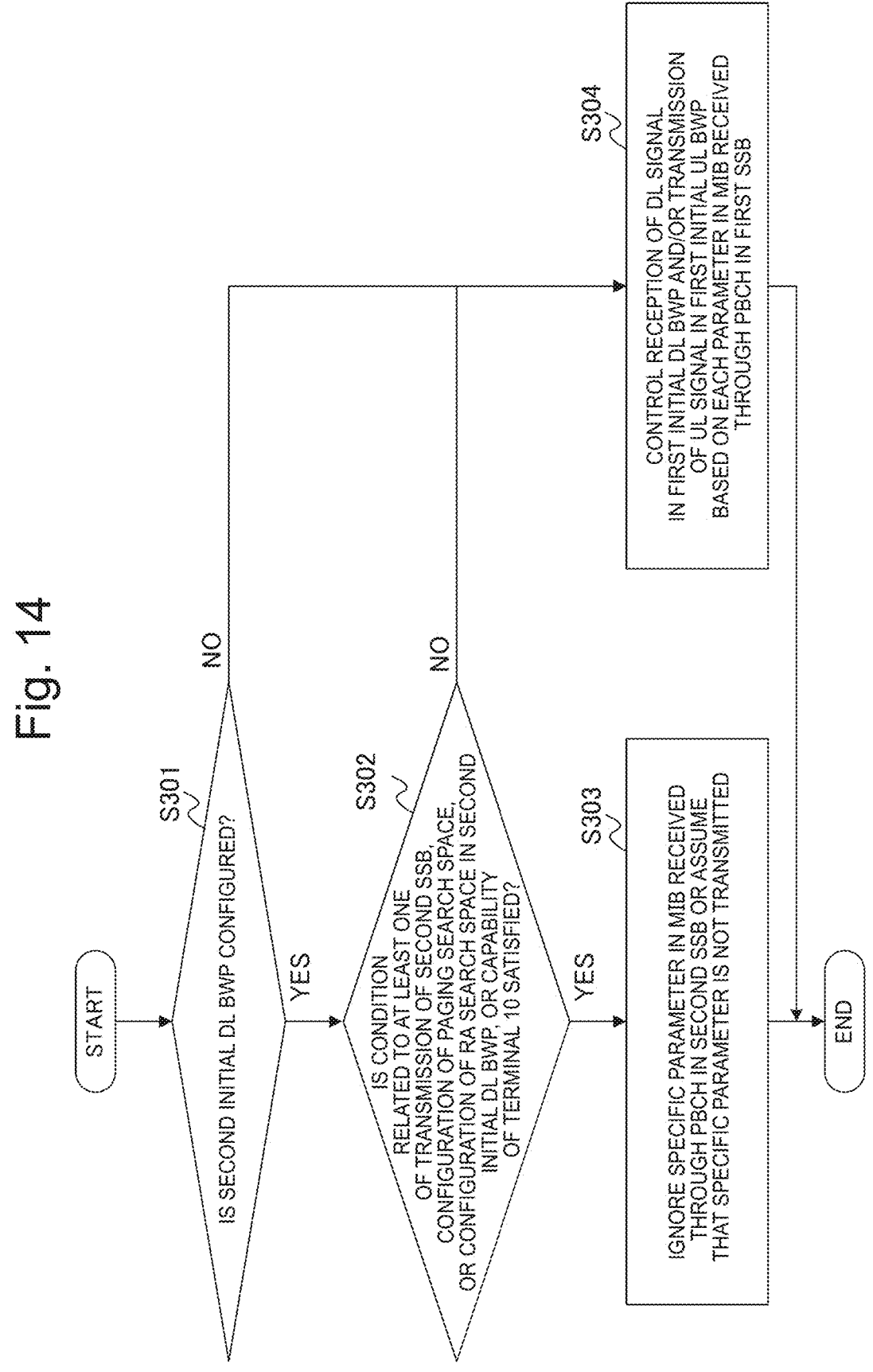
FIG. 14 is a flowchart illustrating an example of an operation during MIB reception according to the present embodiment.

Information (hereinafter, referred to as "cellBarred") related to whether or not a cell (camping on the cell) is barred Information (hereinafter, referred to as "intraFreqRese-lection") related to selection and/or reselection of an intra-frequency cell FIG. 14 is a flowchart illustrating an example of the operation during the MIB reception according to the present embodiment. In FIG. 14, the first initial DL BWP is assumed to be configured in the terminal 10. In step S301, the terminal 10 determines whether the second initial DL BWP is configured.

In step S302, in a case where the second initial DL BWP is configured in the terminal 10, the terminal 10 determines whether a condition related to at least one of transmission of the second SSB in the second initial DL BWP, configuration of the paging search space in the second initial DL BWP, configuration of the RA search space in the second initial DL BWP, or the capability of the terminal 10 is satisfied. Specifically, the terminal 10 may determine whether at least one of the following conditions is satisfied.

(i) Transmission of the second SSB in the second initial DL BWP is configured.

(ii) The paging search space is configured in the second initial DL BWP.

(iii) The RA search space is configured in the second initial DL BW.

(iv) The terminal 10 has a specific capability.

For example, the conditions (i), (ii), and (iv) are the same as the conditions (a), (b), and (c). The condition (iii) is the same as the condition (B).

In a case where the second initial DL BWP is configured and the condition in step S302 is satisfied (step S302; YES), the terminal 10, in step S303, may ignore the specific parameter in the MIB received through the PBCH in the second SSB or assume that the specific parameter is not transmitted.

Here, the specific parameter in the MIB is, for example, but not limited to, at least one of cellBarred, intraFreqRe-selection, or ssb-SubcarrierOffset. The specific parameter may be at least one parameter in the MIB. The terminal 10 may control reception of the DL signal in the second initial DL BWP and/or transmission of the UL signal in the second initial UL BWP based on a parameter other than the specific parameter in the MIB.

In a case where the second initial DL BWP is not configured (step S301; NO) or in a case where the second initial DL BWP is configured and the condition in step S302 is not satisfied (step S302; NO), the terminal 10, in step S304, may control reception of the DL signal in the first initial DL BWP and/or transmission of the UL signal in the first initial UL BWP based on each parameter in the MIB received through the PBCH in the first SSB.

The operation of the terminal 10 in a case where the second initial DL BWP is configured is not limited to the above. For example, in a case where the second initial DL BWP is configured in the terminal 10, the terminal 10 may interpret the specific parameter in the MIB received through the PBCH in the second SSB as having a specific meaning regardless of a value of the specific parameter. The specific parameter may be, for example, cellBarred, and the terminal 10 may interpret cellBarred as indicating that the cell is not barred even in a case where cellBarred indicates that the cell is barred.

According to the above operation, in a case where the second SSB may be transmitted in not only the first initial DL BWP but also the second initial DL BWP, the operation can be suitably performed based on the MIB.

Parameter

An example of the parameters or information used for configuring the terminal 10 for the operations (1) to (3) based on the SSB in the present embodiment will be described with reference to FIGS. 15 to 18. Each parameter or information illustrated in FIGS. 15 to 18 is merely an example, and names, sizes, a hierarchy, and the like are not limited to the illustration. In addition, parameters or information not illustrated in FIGS. 15 to 18 may, of course, be used in the operations (1) to (3) in the present embodiment.

FIG. 15 is a diagram illustrating an example of BWP-DownlinkCommon according to the present embodiment. BWP-DownlinkCommon is information used for configuring a common parameter of the DL BWP and may be included in ServingCellConfigCommon or in ServingCell-ConfigCommonSIB. ServingCellConfigCommonSIB is a cell-specific parameter and may be included in the SIB1. ServingCellConfigCommon is a cell-specific configuration parameter and may be included in other RRC messages.

As illustrated in FIG. 15, BWP-DownlinkCommon may include at least one of the following.

genericParameters which is the first initial DL BWP information pdcch-ConfigCommon which is information related to configuration of the PDCCH in the first initial DL BWP pdsch-ConfigCommon which is information related to configuration of the PDSCH in the first initial DL BWP genericParametersRedCap which is the second initial DL BWP information pdcch-ConfigCommonRedCap which is information related to configuration of the PDCCH in the second initial DL BWP pdsch-ConfigCommonRedCap which is information related to configuration of the PDSCH in the second initial DL BWP, and at least one of additionalSSB-PositionsInBurst, additionalSSB-periodicityServing-Cell, additional-SS-PBCH-BlockPower, addition-alSSB-Frequency, or additionalSSB-SMTC as the second SSB transmission information groupPresence in additionalSSB-PositionsInBurst is information indicating whether each SSB group is actually transmitted in a case where the maximum 64 SSBs that can be transmitted in the SS burst set are divided into eight SSB groups, using a value of each corresponding bit. In addition, inOneGroup is information indicating whether each SSB in the SSB group is actually transmitted, using a value of each corresponding bit. In an operation band below 6 GHz, only the information indicated by inOneGroup may be used. In addition, in an operation band above 6 GHz, the information indicated by inOneGroup and by group-Presence may be used.

FIG. 16 is a diagram illustrating an example of BWP-UplinkCommon according to the present embodiment. BWP-UplinkCommon is information used for configuring a common parameter of the UL BWP and may be included in ServingCellConfigCommon or in ServingCellConfigCommonSIB. ServingCellConfigCommonSIB is a cell-specific parameter and may be included in the SIB1. ServingCellConfigCommon is a cell-specific configuration parameter and may be included in other RRC messages.

As illustrated in FIG. 16, BWP-UplinkCommon may include at least one of the following.

genericParameters which is the first initial UL BWP information rach-ConfigCommon which is information related to configuration of the random access in the first initial UL BWP pusch-ConfigCommon which is information related to configuration of the PUSCH in the first initial UL BWP pucch-ConfigCommon which is information related to configuration of the PUCCH in the first initial UL BWP msgA-ConfigCommon which is information related to transmission of message A in the first initial UL BWP genericParametersRedCap which is the second initial UL BWP information rach-ConfigCommonRedCap which is information related to configuration of the random access in the second initial UL BWP pusch-ConfigCommonRedCap which is information related to configuration of the PUSCH in the second initial UL BWP pucch-ConfigCommonRedCap which is information related to configuration of the PUCCH in the second initial UL BWP msgA-ConfigCommonRedCap which is information related to transmission of message A in the second initial UL BWP FIG. 17 is a diagram illustrating an example of RACH-ConfigCommon according to the present embodiment. RACH-ConfigCommon may function as information (that is, rach-ConfigCommon) related to configuration of the random access in the first initial UL BWP or may function as information (that is, rach-ConfigCommonRedCap) related to configuration of the random access in the second initial UL BWP.

As illustrated in FIG. 17, pusch-ConfigCommon may include at least one of the following parameters.

ssb-perRACH-OccasionAndCB-PreamblesPerSSB which is information indicating the number of first or second SSBs per RO and/or the number of RA preambles per first or second SSB rsrp-ThresholdSSB which is information related to the threshold of the RSRP of the first or second SSB FIG. 18 is a diagram illustrating an example of RACH-ConfigCommonTwoStepRA according to the present embodiment. RACH-ConfigCommonTwoStepRA may function as information (that is, msgA-ConfigCommon) related to transmission of message A in the first initial UL BWP or may function as information (that is, msgA-ConfigCommonRedCap) related to transmission of message A in the second initial UL BWP.

As illustrated in FIG. 18, RACH-ConfigCommonTwoStepRA may include at least one of the following parameters.

msgA-ssb-perRACH-OccasionAndCB-Preambles-PerSSB which is information indicating the number of first or second SSBs per RO and/or the number of RA preambles per first or second SSB msgA-rsrp-ThresholdSSB which is information related to the threshold of the RSRP of the first or second SSB Configuration of Wireless Communication System Next, a configuration of each apparatus of the wireless communication system 1 described above will be described. The following configuration illustrates a necessary configuration in describing the present embodiment and does not exclude each apparatus including a functional block other than the illustrated functional blocks.

Hardware Configuration

Figure 19:
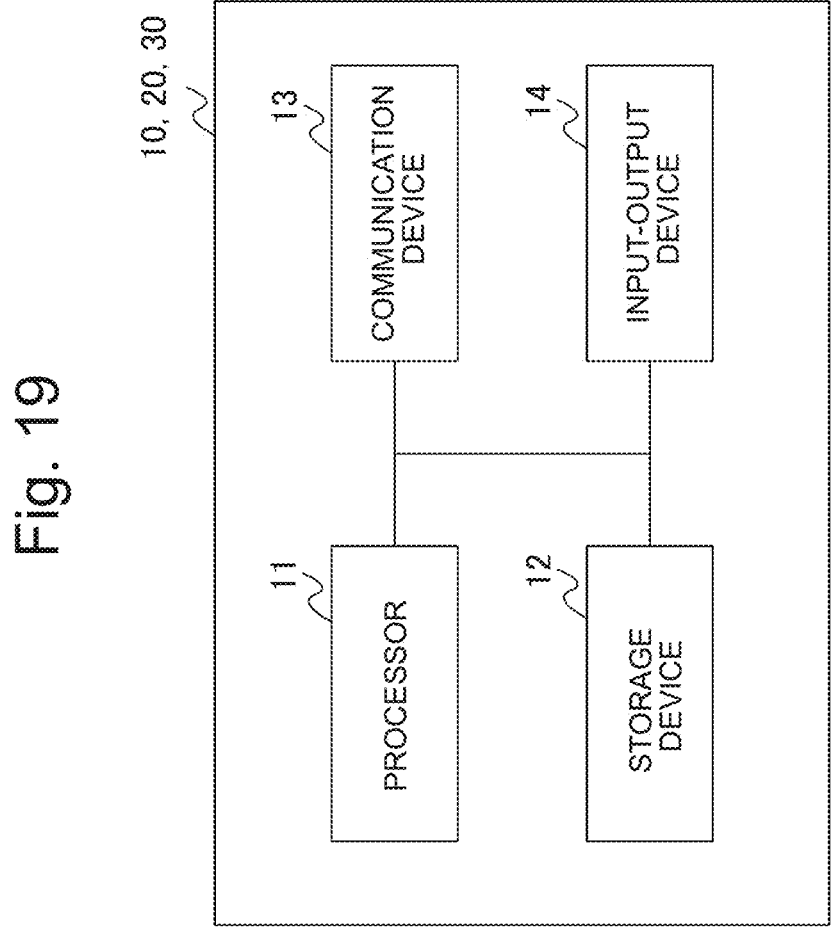
FIG. 19 is a diagram illustrating an example of a hardware configuration of each apparatus in the wireless communication system according to the present embodiment.

FIG. 19 is a diagram illustrating an example of a hardware configuration of each apparatus in the wireless communication system according to the present embodiment. Each apparatus (for example, the terminal 10, the base station 20, and the CN 30) in the wireless communication system 1 includes a processor 11, a storage device 12, a communication device 13 that performs wired or wireless communication, and an input device that receives various input operations or an input-output device 14 that outputs various types of information.

The processor 11 is, for example, a central processing unit (CPU) and controls each apparatus in the wireless communication system 1. The processor 11 may perform various types of processing described in the present embodiment by reading out a program from the storage device 12 and executing the program. Each apparatus in the wireless communication system 1 may be configured with one or a plurality of processors 11. In addition, each apparatus may be called a computer.

The storage device 12, for example, is configured with a storage such as a memory, a hard disk drive (HDD), and/or a solid state drive (SSD). The storage device 12 may store various types of information (for example, the program executed by the processor 11) necessary for executing the processing via the processor 11.

The communication device 13 is a device that performs communication through a wired and/or wireless network and may include, for example, a network card, a communication module, a chip, or an antenna. In addition, the communication device 13 may include a radio frequency (RF) device that performs processing related to an amplifier and to a radio signal and a baseband (BB) device that performs baseband signal processing.

The RF device generates a radio signal to be transmitted from the antenna by performing, for example, D/A conversion, modulation, frequency conversion, and power amplification with respect to a digital baseband signal received from the BB device. In addition, the RF device generates a digital baseband signal by performing frequency conversion, demodulation, A/D conversion, and the like with respect to a radio signal received from the antenna and transmits the digital baseband signal to the BB device.

The BB device performs processing of converting data into a digital baseband signal. Specifically, the BB device may generate an OFDM symbol by mapping the data to a subcarrier and performing an IFFT and generate the digital baseband signal by inserting a CP into the generated OFDM symbol. The BB device may apply a transform precoder (DFT spreading) before mapping the data to the subcarrier.

In addition, the BB device performs processing of converting a digital baseband signal into data. Specifically, the BB device may remove the CP from the digital baseband signal input from the RF device and extract a signal of the frequency domain by performing an FFT with respect to the signal in which the CP is removed. The BB device may apply an IDFT to the signal of the frequency domain.

The input-output device 14, for example, includes an input device such as a keyboard, a touch panel, a mouse, and/or a microphone and, for example, includes an output device such as a display and/or a speaker.

The hardware configuration described above is merely an example. Each apparatus in the wireless communication system 1 may be partially omitted in the hardware described in FIG. 19 or may include hardware not described in FIG. 19. In addition, the hardware illustrated in FIG. 19 may be configured with one or a plurality of chips.

Functional Block Configuration

Terminal

Figure 20:
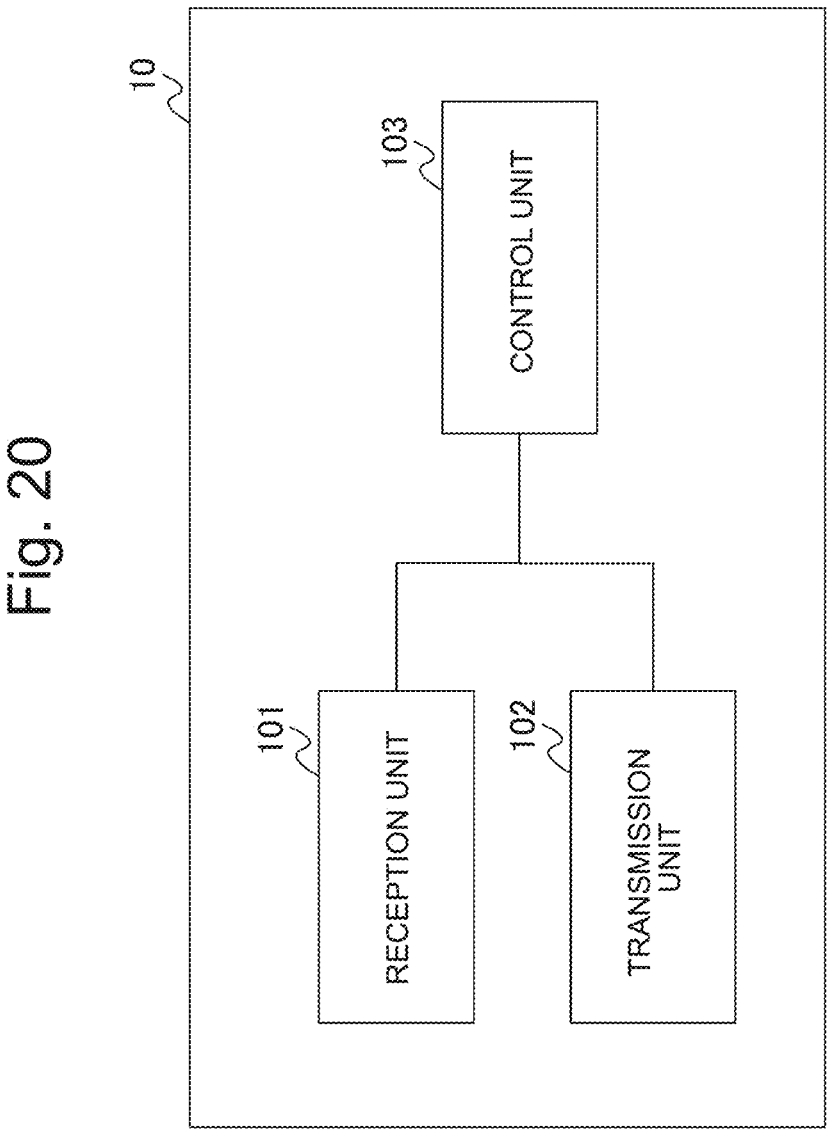
FIG. 20 is a diagram illustrating a functional block configuration of a terminal according to the present embodiment.

FIG. 20 is a diagram illustrating an example of a functional configuration of the terminal according to the present embodiment. As illustrated in FIG. 20, the terminal 10 includes a reception unit 101, a transmission unit 102, and a control unit 103. The functional configuration illustrated in FIG. 20 is merely an example. Any functional distinction and any names of functional units may be used as long as the operation according to the present embodiment can be executed. In addition, the reception unit 101 and the transmission unit 102 may be collectively referred to as a communication unit.

All or a part of the functions implemented by the reception unit 101 and by the transmission unit 102 can be implemented using the communication device 13. In addition, all or a part of the functions implemented by the reception unit 101 and by the transmission unit 102 and the control unit 103 can be implemented by executing the program stored in the storage device 12 via the processor 11. In addition, the program can be stored in a storage medium. The storage medium in which the program is stored may be a non-transitory computer readable medium. The non-transitory storage medium is not particularly limited and, for example, may be a storage medium such as a USB memory or a CD-ROM.

The reception unit 101 receives a signal (for example, the DL signal and/or a sidelink signal). In addition, the reception unit 101 may receive information and/or data transmitted through the signal. Here, the term "receive", for example, may include performing processing related to reception such as at least one of reception of a radio signal, demapping, demodulation, decoding, monitoring, or measurement. The DL signal may include at least one of, for example, the PDSCH, the PDCCH, a downlink reference signal, the synchronization signal, or the PBCH.

The reception unit 101 detects the DCI by monitoring the PDCCH candidates in the search space. The reception unit 101 may receive DL data through the PDSCH scheduled using the DCI. The DL data may include downlink user data and/or control information of a higher layer (for example, parameters of at least one of the MAC layer, an RRC layer, or the non access stratum (NAS) layer). The reception unit 101 may receive the system information through the PBCH and/or the PDSCH.

The transmission unit 102 transmits a signal (for example, the UL signal and/or the sidelink signal). In addition, the transmission unit 102 may transmit information and/or data transmitted through the signal. Here, the term "transmit", for example, may include performing processing related to transmission such as at least one of encoding, modulation, mapping, or transmission of a radio signal. The UL signal may include at least one of, for example, the PUSCH, the PRACH, the PUCCH, or an uplink reference signal.

The transmission unit 102 may transmit UL data through the PUSCH scheduled using the DCI received by the reception unit 101. Uplink user data and/or control information of a higher layer (for example, parameters of at least one of the MAC layer, the RRC layer, or the NAS layer) may be transmitted in the UL data.

The control unit 103 performs various controls in the terminal 10. Specifically, the control unit 103 may control the operation of the terminal 10 based on information (for example, the parameters of the RRC layer) related to various types of configuration received by the reception unit 101 from the base station 20 or from other terminals 10. Operating the terminal 10 based on the information may be synonymous with "configuring the configuration information in the terminal 10".

The control unit 103 may control reception of the signal in the reception unit 101. In addition, the control unit 103 may control transmission of the signal in the transmission unit 102. The control unit 103 may determine whether to apply the transform precoder to the signal transmitted by the transmission unit 102.

In the present embodiment, the terminal 10 may include the reception unit 101 that receives the downlink control information used for scheduling the downlink shared channel for transmitting the paging message by monitoring the downlink control channel using the search space (for example, the paging search space) in a given period (for example, the PDCCH monitoring occasion), and the control unit 103 that determines the given period based on whether the second initial downlink bandwidth part (DL BWP) is configured in the cell C in which the first initial downlink bandwidth part (DL BWP) is configured.

In a case where the second initial DL BWP is configured, the control unit 103 may determine the given period based on whether a condition related to at least one of transmission of the second synchronization signal block (SSB) in the second initial DL BWP, configuration of the search space in the second initial DL BWP, or the capability of the terminal is satisfied.

In a case where the second initial DL BWP is configured and the condition is satisfied, the control unit 103 may determine the given period based on at least one of information (for example, additionalSSB-PositionInBurst) related to transmission of the second SSB or information (for example, pdcch-ConfigCommonRedCap) related to configuration of the downlink control channel in the second initial DL BWP.

In a case where a search space of other than a specific ID (for example, "0") is configured as the search space, the control unit 103 may determine the given period based on at least one of information (for example, additionalSSB-PositionInBurst) related to transmission of the second SSB or information (for example, pdcch-ConfigCommonRedCap) related to configuration of the downlink control channel in the second initial DL BWP.

In a case where the second initial DL BWP is configured and the condition is not satisfied, the control unit 103 may determine the given period based on at least one of information (for example, SSB-PositionInBurst) related to transmission of the first SSB or information (for example, pdcch-ConfigCommon) related to configuration of the downlink control channel in the first initial DL BWP.

In a case where a search space of other than a specific ID (for example, "0") is configured as the search space, the control unit 103 may determine the given period based on at least one of information (for example, SSB-PositionInBurst) related to transmission of the first SSB or information (for example, pdcch-ConfigCommon) related to configuration of the downlink control channel in the first initial DL BWP.

In a case where the second initial DL BWP is not configured, the control unit 103 may determine the given period based on at least one of information (for example, SSB-PositionInBurst) related to transmission of the first SSB or information (for example, pdcch-ConfigCommon) related to configuration of the downlink control channel in the first initial DL BWP.

In addition, in the present embodiment, the terminal 10 may include the transmission unit 102 that transmits the random access preamble, and the control unit 103 that selects the random access preamble and/or the resource used for transmitting the random access preamble based on whether the second initial downlink bandwidth part (DL BWP) is configured in the cell in which the first initial downlink bandwidth part (DL BWP) is configured.

In a case where the second initial DL BWP is configured, the control unit 103 may select the random access preamble and/or the resource based on whether a condition related to at least one of transmission of the second synchronization signal block (SSB) in the second initial DL BWP, configuration of the search space for the random access in the second initial DL BWP, configuration of the second random access parameter related to the random access in the second initial DL BWP, or the capability of the terminal is satisfied.

In a case where the second initial DL BWP is configured and the condition is satisfied, the control unit 103 may select the random access preamble and/or the resource based on at least one of information (for example, additionalSSB-PositionInBurst) related to transmission of the second SSB, the second random access parameter (for example, RACH-ConfigCommonRedCap), or the received power of the second SSB.

The second random access parameter may include at least one of information (for example, ssb-perRACH-OccasionAndCB-preamblesPerSSB) related to association between the second SSB and the resource and/or the random access preamble or information (for example, RSRP-Threshold-SSB) related to the threshold of the received power of the second SSB.

In a case where the second initial DL BWP is configured and the condition is not satisfied, the control unit 103 may select the random access preamble and/or the resource based on at least one of information (for example, ssb-PositionsInBurst) related to transmission of the first synchronization signal block (SSB) in the first initial DL BWP, the first random access parameter (for example, Rach-ConfigCommon) related to the random access in the first initial DL BWP, or the received power of the first SSB.

In a case where the second initial DL BWP is not configured, the control unit 103 may select the random access preamble and/or the resource based on at least one of information (for example, ssb-PositionsInBurst) related to transmission of the first synchronization signal block (SSB) in the first initial DL BWP, the first random access parameter (for example, Rach-ConfigCommon) related to the random access in the first initial DL BWP, or the received power of the first SSB.

The first random access parameter may include at least one of information (for example, ssb-perRACH-OccasionAndCB-preamblesPerSSB) related to association between the first SSB and the resource and/or the random access preamble or information (for example, RSRP-Threshold-SSB) related to the threshold of the received power of the first SSB.

In the present embodiment, the terminal 10 may include the reception unit 101 that receives the master information block (MIB), and the control unit 103 that controls an operation based on a specific parameter in the MIB depending on whether the second initial downlink bandwidth part (DL BWP) is configured in the cell in which the first initial downlink bandwidth part (DL BWP) is configured.

In a case where the second initial DL BWP is configured, the control unit 103 may ignore the specific parameter or assume that the specific parameter is not transmitted based on whether a condition related to at least one of transmission of the second synchronization signal block (SSB) in the second initial DL BWP, configuration of the search space for the paging in the second initial DL BWP, configuration of the search space for the random access in the second initial DL BWP, or the capability of the terminal is satisfied.

In a case where the second initial DL BWP is configured and the condition is satisfied, the control unit 103 may ignore the specific parameter in the MIB received through the broadcast channel included in the second SSB or assume that the specific parameter is not transmitted.

The specific parameter may include at least one of information (for example, cellBarred) related to whether or not the cell is barred, information (for example, intraFreqReselection) related to selection and/or reselection of the intra-frequency cell, or information (for example, ssb-SubcarrierOffset) related to the frequency domain offset between the second SSB and the resource block grid.

In a case where the second initial DL BWP is configured, the control unit 103 may interpret the specific parameter as having a specific meaning regardless of the value of the specific parameter. The specific parameter may include information (for example, cellBarred) related to whether the cell is barred, and the control unit 103 may interpret the cell as indicating that the cell is not barred regardless of the value indicated by the information.

Base Station

Figure 21:
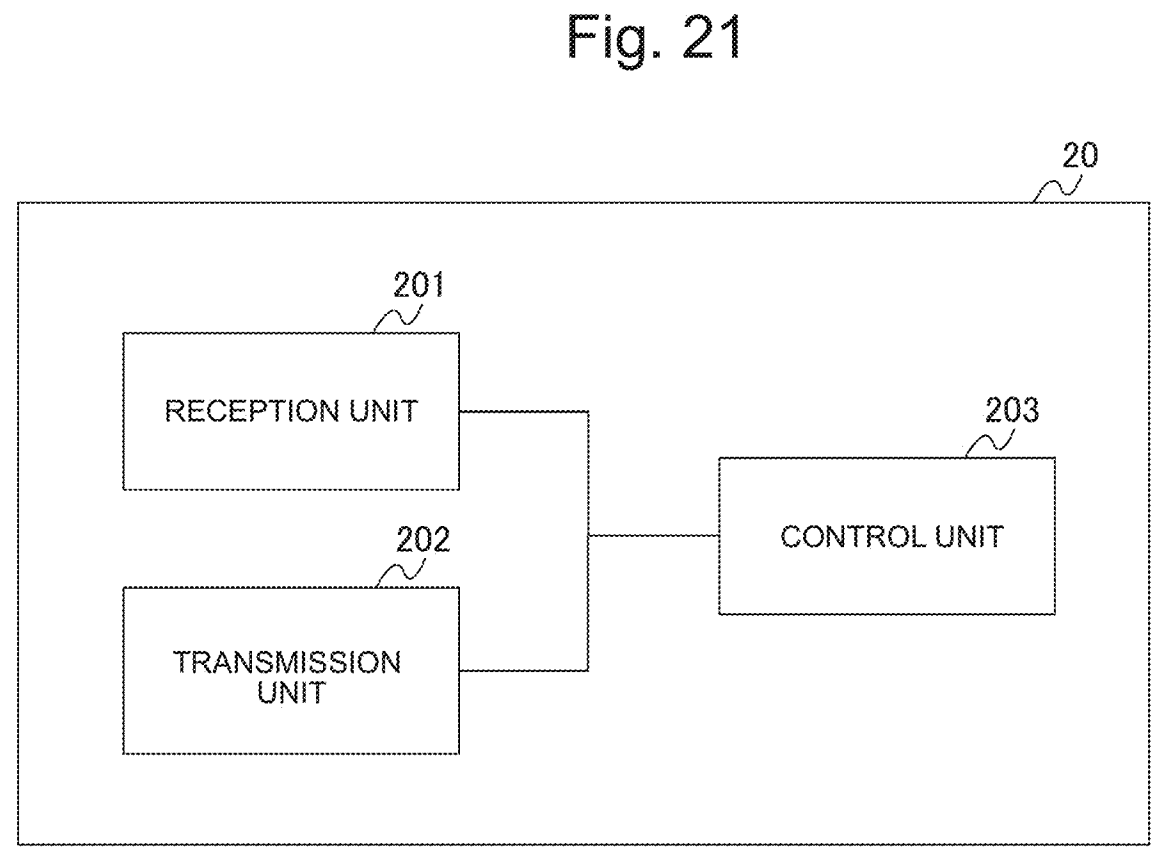

FIG. 21 is a diagram illustrating an example of a functional block configuration of the base station according to the present embodiment. As illustrated in FIG. 21, the base station 20 includes a reception unit 201, a transmission unit 202, and the control unit 203. The functional configuration illustrated in FIG. 21 is merely an example. Any functional distinction and any names of functional units with which the operation according to the present embodiment can be executed may be used. In addition, the reception unit 201 and the transmission unit 202 may be collectively referred to as a communication unit.

All or a part of the functions implemented by the reception unit 201 and by the transmission unit 202 can be implemented using the communication device 13. In addition, all or a part of the functions implemented by the reception unit 201 and by the transmission unit 202 and the control unit 203 can be implemented by executing the program stored in the storage device 12 via the processor 11. In addition, the program can be stored in a storage medium. The storage medium in which the program is stored may be a non-transitory computer readable medium. The non-transitory storage medium is not particularly limited and, for example, may be a storage medium such as a USB memory or a CD-ROM.

The reception unit 201 receives a signal (for example, the UL signal and/or the sidelink signal). In addition, the reception unit 201 may receive information and/or data (for example, the UL data) transmitted through the signal.

The transmission unit 202 transmits a signal (for example, the DL signal and/or the sidelink signal). In addition, the transmission unit 202 may transmit information and/or data (for example, the DL data) transmitted through the signal. A part of the information transmitted from the transmission unit 202 may be transmitted by a transmission unit in the core network apparatus.

The control unit 203 performs various controls for communicating with the terminal 10. Specifically, the control unit 203 may determine information related to various types of configuration of which the terminal 10 is informed. Transmitting the information to the terminal 10 may be synonymous with "configuring the information in the terminal".

The control unit 203 may control reception of the signal in the reception unit 201. In addition, the control unit 203 may control transmission of the signal in the transmission unit 202.

In the present embodiment, the base station 20 may include the transmission unit 202 that transmits the downlink control information used for scheduling the downlink shared channel for transmitting the paging message by monitoring the downlink control channel using the search space (for example, the paging search space) in a given period (for example, the PDCCH monitoring occasion), and the control unit 203 that determines the given period based on whether the second initial downlink bandwidth part (DL BWP) is configured in the cell C in which the first initial downlink bandwidth part (DL BWP) is configured.

In addition, in the present embodiment, the base station 20 may include the reception unit 201 that receives the random access preamble, and the control unit 203 that controls transmission of the DL signal and/or reception of the UL signal based on the random access preamble and/or the resource used for receiving the random access preamble.

The control unit 203 may estimate the quasi-collocation (QCL) relationship for the terminal 10 based on the random access preamble and/or the synchronization signal block (SSB) associated with the random access preamble. The control unit 203 may control transmission of the DL signal and/or reception of the UL signal using the same beam as the SSB.

In the present embodiment, the base station 20 may include the transmission unit 202 that transmits the master information block (MIB), and the control unit 203 that controls transmission of a specific parameter in the MIB depending on whether the second initial downlink bandwidth part (DL BWP) is configured in the cell in which the first initial downlink bandwidth part (DL BWP) is configured.

In a case where the second initial DL BWP is configured, the control unit 203 may stop transmission of the specific parameter in the MIB through the broadcast channel included in the second SSB based on whether a condition related to at least one of transmission of the second synchronization signal block (SSB) in the second initial DL BWP, configuration of the search space for the paging in the second initial DL BWP, configuration of the search space for the random access in the second initial DL BWP, or the capability of the terminal is satisfied.

In a case where the second initial DL BWP is configured and the condition is satisfied, the control unit 203 may stop transmission of the specific parameter in the MIB through the broadcast channel included in the second SSB.

Supplement

Various signals, information, and parameters in the embodiment may be signaled in any layer. That is, the various signals, information, and parameters may be replaced with signals, information, and parameters of any layer such as a higher layer (for example, the NAS layer, the RRC layer, and the MAC layer) and a lower layer (for example, the physical layer). In addition, informing an apparatus of given information is not limited to explicit informing and may be implicitly performed (for example, without informing the apparatus of information or using other types of information).

In addition, names of various signals, information, parameters, IEs, channels, time units, and frequency units in the embodiment are merely an example and may be replaced with other names. For example, a slot may have any name of a time unit having a given number of symbols. In addition, an RB may have any name of a frequency unit having a given number of subcarriers. In addition, the terms "first" and "second" are simply for identifying a plurality of pieces of information or signals and may be reversed in order, as appropriate.

For example, in the embodiment, each of the PDSCH, the PUSCH, the PDCCH, the PBCH, the PRACH, and the like has been illustrated in the present embodiment as examples of a physical channel for transmitting the DL data, a physical channel for transmitting the UL data, a physical channel for transmitting the DCI, a physical channel for transmitting broadcast information, and a physical channel for transmitting the RA preamble. However, the physical channels are not limited to the illustrated names as long as the physical channels have the same functions. In addition, these physical channels may be replaced with transport channels to which the physical channels are mapped. In addition, each of the PDSCH, the PUSCH, the PDCCH, the PBCH, the PRACH, and the like may be replaced with a transport channel (for example, at least one of a downlink shared channel (DL-SCH), an uplink shared channel (UL-SCH), a broadcast channel (BCH), or a random access channel (RCH)) and the like mapped to a physical channel. In addition, these transport channels may be replaced with logical channels to which the transport channels are mapped. In addition, the DL data and the UL data may be downlink data and uplink data, respectively, and the data may include user data and control information of a higher layer (for example, the RRC parameters and the medium access control (MAC) parameters).

In addition, the terminal 10 in the embodiment is not limited to the illustrated purposes (for example, RedCap and IoT) and may be used for any purposes (for example, eMBB, URLLC, device-to-device (D2D), and vehicle-to-everything (V2X)) as long as the terminal 10 has the same functions. In addition, forms of various types of information are not limited to the embodiment and may be changed to a bit representation (0 or 1), a truth value (boolean; true or false), an integer value, a text, and the like, as appropriate. In addition, singular forms and plural forms in the embodiment may be changed from each other.

The embodiment described above is for easy understanding of the present disclosure and is not to be interpreted as limiting the present disclosure. The flowcharts, sequences, each element in the embodiment and positioning of the elements, indexes, conditions, and the like described in the embodiment are not limited to the illustration and can be changed, as appropriate. In addition, at least a part of the configurations described in the embodiment can be partially replaced or combined with each other.

The invention claimed is:

1. A wireless communication method of a terminal, the method comprising:
   receiving, from a base station, system information including information used for configuring a first initial downlink bandwidth part, cell-specific information used for configuring a physical downlink control channel of the first initial downlink bandwidth part, information used for configuring a second initial downlink bandwidth part, and cell-specific information used for configuring a physical downlink control channel of the second initial downlink bandwidth part; and
   in a case where an identifier of a search space for a paging is included in the cell-specific information used for configuring the physical downlink control channel of the second initial downlink bandwidth part, determining a monitoring occasion of the physical downlink control channel for the paging based on the identifier of the search space for the paging and information used for configuring a synchronization signal and physical broadcast channel (SS/PBCH) block transmitted in the second initial downlink bandwidth part.

2. The wireless communication method according to claim 1,
   wherein the information used for configuring the SS/PBCH block transmitted in the second initial downlink bandwidth part is included in the system information.

3. The wireless communication method according to claim 1, wherein
   the information used for configuring the SS/PBCH block transmitted in the second initial downlink bandwidth part includes information related to transmitted SS/PBCH blocks in an SS-burst.

4. The wireless communication method according to claim 1, wherein
   the information used for configuring the first initial downlink bandwidth part includes information used for indicating a frequency domain location and bandwidth of the first initial downlink bandwidth part and information used for indicating a subcarrier spacing of the first initial downlink bandwidth part, and
the information used for configuring the second initial downlink bandwidth part includes information used for indicating a frequency domain location and bandwidth of the second initial downlink bandwidth part and information used for indicating a subcarrier spacing of the second initial downlink bandwidth part.

5. The wireless communication method according to claim 1,
   wherein the information used for configuring the second initial downlink bandwidth part and the cell-specific information used for configuring the physical downlink control channel of the second initial downlink bandwidth part are for a RedCap terminal.

6. A terminal comprising:
   a memory storing instructions; and
   one or more processors configured to execute the instructions to:
   receive, from a base station, system information including information used for configuring a first initial downlink bandwidth part, cell-specific information used for configuring a physical downlink control channel of the first initial downlink bandwidth part, information used for configuring a second initial downlink bandwidth part, and cell-specific information used for configuring a physical downlink control channel of the second initial downlink bandwidth part; and
   in a case where an identifier of a search space for a paging is included in the cell-specific information used for configuring the physical downlink control channel of the second initial downlink bandwidth part, determine a monitoring occasion of the physical downlink control channel for the paging based on the identifier of the search space for the paging and information used for configuring a synchronization signal and physical broadcast channel (SS/PBCH) block transmitted in the second initial downlink bandwidth part.

7. The terminal according to claim 6,
   wherein the information used for configuring the SS/PBCH block transmitted in the second initial downlink bandwidth part is included in the system information.

8. The terminal according to claim 6, wherein
   the information used for configuring the SS/PBCH block transmitted in the second initial downlink bandwidth part includes information related to transmitted SS/PBCH blocks in an SS-burst.

9. The terminal according to claim 6, wherein
   the information used for configuring the first initial downlink bandwidth part includes information used for indicating a frequency domain location and bandwidth of the first initial downlink bandwidth part and information used for indicating a subcarrier spacing of the first initial downlink bandwidth part, and
the information used for configuring the second initial downlink bandwidth part includes information used for indicating a frequency domain location and bandwidth of the second initial downlink bandwidth part and information used for indicating a subcarrier spacing of the second initial downlink bandwidth part.

10. The terminal according to claim 6, wherein the information used for configuring the second initial downlink bandwidth part and the cell-specific information used for configuring the physical downlink control channel of the second initial downlink bandwidth part are for a RedCap terminal.

11. A base station comprising:

a memory storing instructions; and one or more processors configured to execute the instructions to:

transmit, to a terminal, system information including information used for configuring a first initial downlink bandwidth part, cell-specific information used for configuring a physical downlink control channel of the first initial downlink bandwidth part, information used for configuring a second initial downlink bandwidth part, and cell-specific information used for configuring a physical downlink control channel of the second initial downlink bandwidth part; and in a case where an identifier of a search space for a paging is included in the cell-specific information used for configuring the physical downlink control channel of the second initial downlink bandwidth part, configure a monitoring occasion of the physical downlink control channel for the paging based on the identifier of the search space for the paging and information used for configuring a synchronization signal and physical broadcast channel (SS/PBCH) block transmitted in the second initial downlink bandwidth part.

12. The base station according to claim 11, wherein the information used for configuring the SS/PBCH block transmitted in the second initial downlink bandwidth part is included in the system information.

13. The base station according to claim 11, wherein the information used for configuring the SS/PBCH block transmitted in the second initial downlink bandwidth part includes information related to transmitted SS/PBCH blocks in an SS-burst.

14. The base station according to claim 11, wherein the information used for configuring the first initial downlink bandwidth part includes information used for indicating a frequency domain location and bandwidth of the first initial downlink bandwidth part and information used for indicating a subcarrier spacing of the first initial downlink bandwidth part, and the information used for configuring the second initial downlink bandwidth part includes information used for indicating a frequency domain location and bandwidth of the second initial downlink bandwidth part and information used for indicating a subcarrier spacing of the second initial downlink bandwidth part.

15. The base station according to claim 11, wherein the information used for configuring the second initial downlink bandwidth part and the cell-specific information used for configuring the physical downlink control channel of the second initial downlink bandwidth part are for a RedCap terminal.

* * * * *